US009829336B2

United States Patent
Takei et al.

(10) Patent No.: US 9,829,336 B2
(45) Date of Patent: Nov. 28, 2017

(54) SERVER FOR NAVIGATION, NAVIGATION SYSTEM, AND NAVIGATION METHOD

(71) Applicant: MITSUBISHI ELECTRIC CORPORATION, Tokyo (JP)

(72) Inventors: Takumi Takei, Tokyo (JP); Masanobu Osawa, Tokyo (JP); Ryosuke Torama, Tokyo (JP); Yuki Furumoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/024,799

(22) PCT Filed: Oct. 22, 2013

(86) PCT No.: PCT/JP2013/078564
§ 371 (c)(1),
(2) Date: Mar. 24, 2016

(87) PCT Pub. No.: WO2015/059764
PCT Pub. Date: Apr. 30, 2015

(65) Prior Publication Data
US 2016/0216129 A1 Jul. 28, 2016

(51) Int. Cl.
*G01C 21/32* (2006.01)
*G10L 15/22* (2006.01)
(Continued)

(52) U.S. Cl.
CPC ......... *G01C 21/3608* (2013.01); *G01C 21/20* (2013.01); *G01C 21/32* (2013.01);
(Continued)

(58) Field of Classification Search
CPC .... G01C 21/32; G01C 21/34; G01C 21/3469; G01C 21/3682; G01C 21/00; G01C 21/36;
(Continued)

(56) References Cited

U.S. PATENT DOCUMENTS

2001/0047241 A1* 11/2001 Khavakh ............... G01C 21/34
701/410
2002/0177946 A1* 11/2002 Ueno .................. G01C 21/3676
701/410
(Continued)

FOREIGN PATENT DOCUMENTS

JP 2002310714 A * 10/2002 ............. G01C 21/00
JP 2002310714 A * 10/2002
(Continued)

OTHER PUBLICATIONS

U.S. Appl. No. 14/422,602, filed Feb. 19, 2015.

*Primary Examiner* — Yuri Kan
(74) *Attorney, Agent, or Firm* — Birch, Stewart, Kolasch & Birch, LLP

(57) ABSTRACT

Because in a server for navigation that causes a navigation device mounted in a moving object to provide guidance on a moving route and display map data on the basis of the map data and the position of the moving object, from a recognition result of a user's utterance and position information, evaluation information about a point or is acquired automatically, an evaluation about the point can be left automatically and safely without requiring the user's special operation. Further, by adding the evaluation information to map data and displaying this map data at the time of use, the navigation system enables the user to revisit a point through which the user desires to pass once again, bypass a point through which the user desires to never pass again, and so
(Continued)

on without requiring the user's work of consciously memorizing the impression about each point and so on.

7 Claims, 40 Drawing Sheets

(51) Int. Cl.
    *G01C 21/36*     (2006.01)
    *G10L 25/54*     (2013.01)
    *G01C 21/20*     (2006.01)
    *G10L 15/08*     (2006.01)

(52) U.S. Cl.
    CPC ..... *G01C 21/3629* (2013.01); *G01C 21/3664* (2013.01); *G01C 21/3667* (2013.01); *G10L 25/54* (2013.01); *G10L 2015/088* (2013.01)

(58) Field of Classification Search
    CPC .... G01C 27/3676; G01L 15/22; G08G 1/017; G08G 1/0969
    See application file for complete search history.

(56) References Cited

U.S. PATENT DOCUMENTS

| | | | |
|---|---|---|---|
| 2005/0050035 A1* | 3/2005 | Ono | G01C 21/36 |
| 2009/0240427 A1* | 9/2009 | Siereveld | G01C 21/3469 |
| | | | 701/533 |
| 2010/0182163 A1* | 7/2010 | Rennie | G08G 1/017 |
| | | | 340/905 |
| 2012/0271633 A1* | 10/2012 | Yoshida | G10L 15/22 |
| | | | 704/248 |
| 2013/0218457 A1* | 8/2013 | Mutoh | G01C 21/34 |
| | | | 701/420 |
| 2014/0057611 A1* | 2/2014 | Homma | G01C 21/3682 |
| | | | 455/414.1 |
| 2014/0354668 A1* | 12/2014 | Seo | G08G 1/0969 |
| | | | 345/581 |

FOREIGN PATENT DOCUMENTS

| | | |
|---|---|---|
| JP | 2007-255897 A | 10/2007 |
| JP | 2008-196998 A | 8/2008 |
| JP | 2011-179917 A | 9/2011 |
| JP | 2013-200684 A | 10/2013 |

\* cited by examiner

| "Good" | "Bad" |
|---|---|
| Beautiful | Dirty |
| Wide | Narrow |
| Easy to Drive | Hard to Drive |
| ⋮ | ⋮ |

FIG.36

| "Good" | "Bad" |
|---|---|
| Beautiful | Dirty |
| Wide | Narrow |
| Easy to Drive | Hard to Drive |
| Oh | Oh |
| Wow | Wow |
| ⋮ | ⋮ |

SERVER FOR NAVIGATION, NAVIGATION SYSTEM, AND NAVIGATION METHOD

FIELD OF THE INVENTION

The present invention relates to a server for navigation, a navigation system, and a navigation method capable of performing recognition on a voice uttered by a user, and registering an evaluation about a point which the user has visited.

BACKGROUND OF THE INVENTION

Generally, there is a case in which the user has a good impression or a bad impression about a road along which the user is passing (or surroundings of the road) during driving or the like, and it is therefore convenient if the user can leave behind the information. However, it is difficult for the user itself to memorize the road along which the user has passed, and its surrounding environment, and it is also troublesome to perform a point registration each time by using a car navigation system or the like.

Further, in general, a navigation system, such as a vehicle-mounted one, has pieces of facility information stored in advance together with map data, and can provide guidance on a route to a predetermined facility and present the existence of facilities using graphics and characters on a map. On the other hand, there is a navigation system that, in addition to those pieces of facility information, has a point registration function of allowing the user to register an arbitrary point. A problem with the navigation system is that although this navigation system can similarly provide guidance on an arbitrary point, and present the existence of registrations, it is troublesome to perform a point registration each time by using a car navigation system or the like and it is hard to use the navigation system for uses such as a use accompanied by a desire to leave an impression about a point freely.

A technique of, in an information storage device mounted in a moving object, analyzing the contents of a passenger's utterance from a voice in the moving object in which this device is mounted by using a voice recognition technology, and recording a comment for a target object to solve the above-mentioned problem is known. For example, in patent reference 1, a technique of leaving a comment for a target object by using a word indicating the target object in an utterance and a word describing the target object is described.

RELATED ART DOCUMENT

Patent Reference

Patent reference 1: Japanese Unexamined Patent Application Publication No. 2011-179917

SUMMARY OF THE INVENTION

Problems to be Solved by the Invention

However, actually, there is a case in which when a passenger utters in a moving object and leaves a comment, he or she omits some words indicating a target object and then utters, or utters an overall impression not just about a specific thing, but about a surrounding environment or the like. In such a case, according to a conventional technology as described in patent reference 1, no comment can be left as expected.

Further, a problem with the conventional device as described in patent reference 1 is that because the use of a comment is limited to that at a time of making a facility search, and therefore a target position needs to be a point for which the user can search in order to use the comment, it takes time for the user to specify a location intentionally, and the user cannot easily grasp a positional relationship between the current position of the vehicle (the moving object) and the location. A further problem is that because text data into which the contents of an utterance are converted is recorded as the comment, or voice data itself is recorded as the comment, just as it is, it is difficult for the user to check the contents in an instant.

The present invention is made in order to solve the above-mentioned problems, and it is therefore an object of the present invention to provide a server for navigation, a navigation system and a navigation method capable of regularly performing recognition on a voice uttered by a user, automatically registering an evaluation about a point which the user has visited, and presenting the evaluation to the user with safety and effectively.

Means for Solving the Problem

In order to achieve the above-mentioned object, in accordance with the present invention, there is provided a server for navigation that causes a navigation device mounted in a moving object to provide guidance on a moving route and display map data on the basis of the map data and the position of the moving object, the server for navigation including: an evaluation information acquiring unit that acquires a predetermined key word which is extracted by regularly performing recognition on data about a voice uttered by a user from the navigation device, and that also refers to an evaluation information correspondence table in which a plurality of key words are brought into correspondence with evaluations respectively for each of the above-mentioned key words in advance to acquire evaluation information corresponding to the predetermined key word acquired thereby; a position-cum-evaluation information generator that combines the evaluation information acquired by the evaluation information acquiring unit and the current position of the moving object acquired from the navigation device to generate position-cum-evaluation information; a position-cum-evaluation information storage that stores the position-cum-evaluation information generated by the position-cum-evaluation information generator; and a display controller that adds predetermined position-cum-evaluation information stored in the position-cum-evaluation information storage to the map data, and that also causes the navigation device to display the map data to which the above-mentioned position-cum-evaluation information is added.

Advantages of the Invention

Because in accordance with the present invention, the server for navigation generates evaluation information with position by converting an utterance on which the server for navigation regularly performs voice recognition into evaluation information and mapping this evaluation information onto position information, and adds the evaluation information with position to the map data and causes display of this map data, the evaluation information with position can be stored regularly and automatically, and safely, and can be presented to the user effectively.

BRIEF DESCRIPTION OF THE FIGURES

FIG. 36 is another example of the evaluation information correspondence table in which each of key words is brought into correspondence with evaluation information;

EMBODIMENTS OF THE INVENTION

Hereafter, the preferred embodiments of the present invention will be explained in detail with reference to the drawings.

Embodiment 1

In accordance with the present invention, there is provided a navigation system that provides guidance on a moving route and displays map data on a vehicle-mounted display (a display unit) on the basis of the map data and the position of a vehicle (a moving object), in which evaluation information is specified from a recognition result acquired by regularly performing recognition on the contents of a user's (a passenger's) utterance, the evaluation information is accumulated while being automatically linked with a point on the basis of the position information and the evaluation information, and the information is presented to the user (the passenger).

Figure 1:
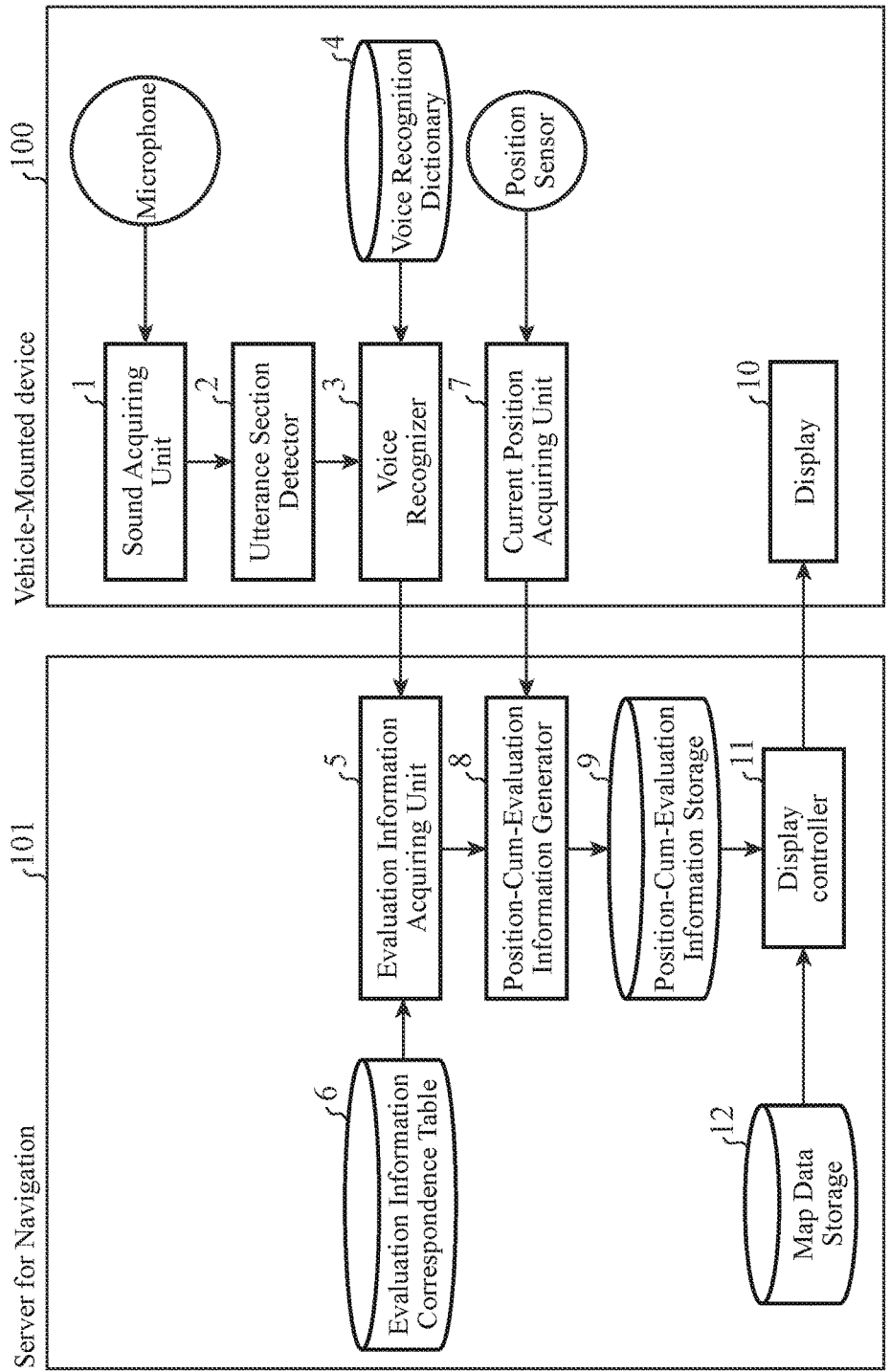
FIG. 1 is a block diagram showing an example of a navigation system in accordance with Embodiment 1.

FIG. 1 is a block diagram showing an example of a navigation system in accordance with Embodiment 1 of the present invention. This navigation system is configured with a vehicle-mounted device (a display device) 100 provided with a sound acquiring unit 1, an utterance section detector 2, a voice recognizer 3, a voice recognition dictionary 4, a current position acquiring unit 7 and a display (a display unit) 10, and a server 101 for navigation provided with an evaluation information acquiring unit 5, an evaluation information correspondence table 6, a position-cum-evaluation information generator 8, a position-cum-evaluation information storage 9, a display controller 11 and a map data storage 12. The vehicle-mounted device (the display device) 100 and the server 101 for navigation perform processes of various functions, such as a navigation function and a display control function, in cooperation with each other.

Further, although not illustrated, this vehicle-mounted device 100 also includes a key input unit that acquires an input signal generated by a key, a touch panel, or the like, and a sound outputter that can sound a voice or a sound effect via a speaker or the like.

Further, although both the vehicle-mounted device 100 and the server 101 for navigation include a communicator (a transmitter and a receiver) to transmit and receive information to and from each other, an illustration and an explanation of this communicator will be also omitted.

The sound acquiring unit 1 in the vehicle-mounted device 100 A/D converts a sound collected by a microphone or the like to acquire a sound signal in, for example, a PCM (Pulse Code Modulation) form. The sound acquiring unit acquires a user's uttered voice, a sound in the surroundings of a vehicle (a moving object), and so on as a sound signal.

The utterance section detector 2 receives the sound signal acquired by the sound acquiring unit 1, and detects an utterance section of a voice corresponding to the contents of an utterance made by a user, such as a fellow passenger in the vehicle, from this sound signal, to extract the utterance section as voice data about this section.

The voice recognizer 3 has the voice recognition dictionary 4, and compares the voice data, which is extracted by the utterance section detector 2, with the voice recognition dictionary 4 and performs a voice recognition process to extract a predetermined key word. In this case, the recognition process can be carried out by using, for example, a typical method such as an HMM (Hidden Markov Model) method. Further, the voice recognizer 3 can use a voice recognition server on a network.

The voice recognition dictionary 4 is configured in such a way that a key word for use in an acquiring process performed by the evaluation information acquiring unit 5, which will be mentioned below, can be recognized, and the voice recognizer 3 outputs that key word as a recognition result (referred to as a "recognition key word" from here on).

By the way, in a voice recognition function mounted in a car navigation system and so on, it is general that a passenger (a user) specifies (commands) a start of utterance or the like to the system. Therefore, a button or the like for commanding a voice recognition start (referred to as a "voice recognition start commander" from here on) is displayed on a touch panel or disposed on a steering wheel. Then, after the voice recognition start commander is pressed down by a passenger (a user), an uttered voice is recognized. More specifically, when the voice recognition start commander outputs a voice recognition start signal and a voice recognition unit receives this signal, after this signal is received, an utterance section of a voice corresponding to the contents of a passenger's (a user's) utterance is detected from a sound signal, which is acquired by a sound acquiring unit, by an utterance section detector, and the above-mentioned recognition process is performed.

In contrast, the voice recognizer 3 in accordance with this Embodiment 1 regularly performs recognition on the contents of a user's utterance even if such a voice recognition start command as above is not provided by the user. More specifically, the voice recognizer 3 repeatedly carries out a process of, even if not receiving the voice recognition start signal, when receiving the sound signal acquired by the sound acquiring unit 1, detecting an utterance section of a voice corresponding to the contents of a user's utterance from this sound signal by means of the utterance section detector 2, comparing voice data about the extracted utterance section with the voice recognition dictionary 4 and performing a voice recognition process, and outputting a key word included in a voice recognition result. The same goes for the following embodiments.

The current position acquiring unit 7 acquires the current position of the vehicle (the moving object) by using a position sensor. The current position acquiring unit acquires latitude and longitude, or the like as the position information. As the position sensor, such a typical GPS (Global Positioning System) receiver as a one mounted in a car navigation system and a mobile phone, a gyroscope, or the like can be used.

The display (the display unit) 10 is, for example, an LCD (Liquid Crystal Display), an organic electroluminescence display, or the like, and presents information to the user in response to a command from the display controller 11 which will be described below. The display displays data about a map, roads, buildings and so on, the vehicle position, and the results of a route search and route guidance, and also presents evaluation information with position. The display can be a display-integrated touch panel, and, for example, can be comprised of an LCD and a touch sensor.

On the other hand, the evaluation information acquiring unit 5 in the server for navigation 101 refers to the evaluation information correspondence table 6 in which a plurality of key words are brought into correspondence with evaluations respectively for each of these key words in advance to acquire evaluation information corresponding to the recognition key word extracted by the voice recognizer 3. An example of the definition of the evaluation information correspondence table 6 is shown in FIG. 2.

Figures 2, 3:
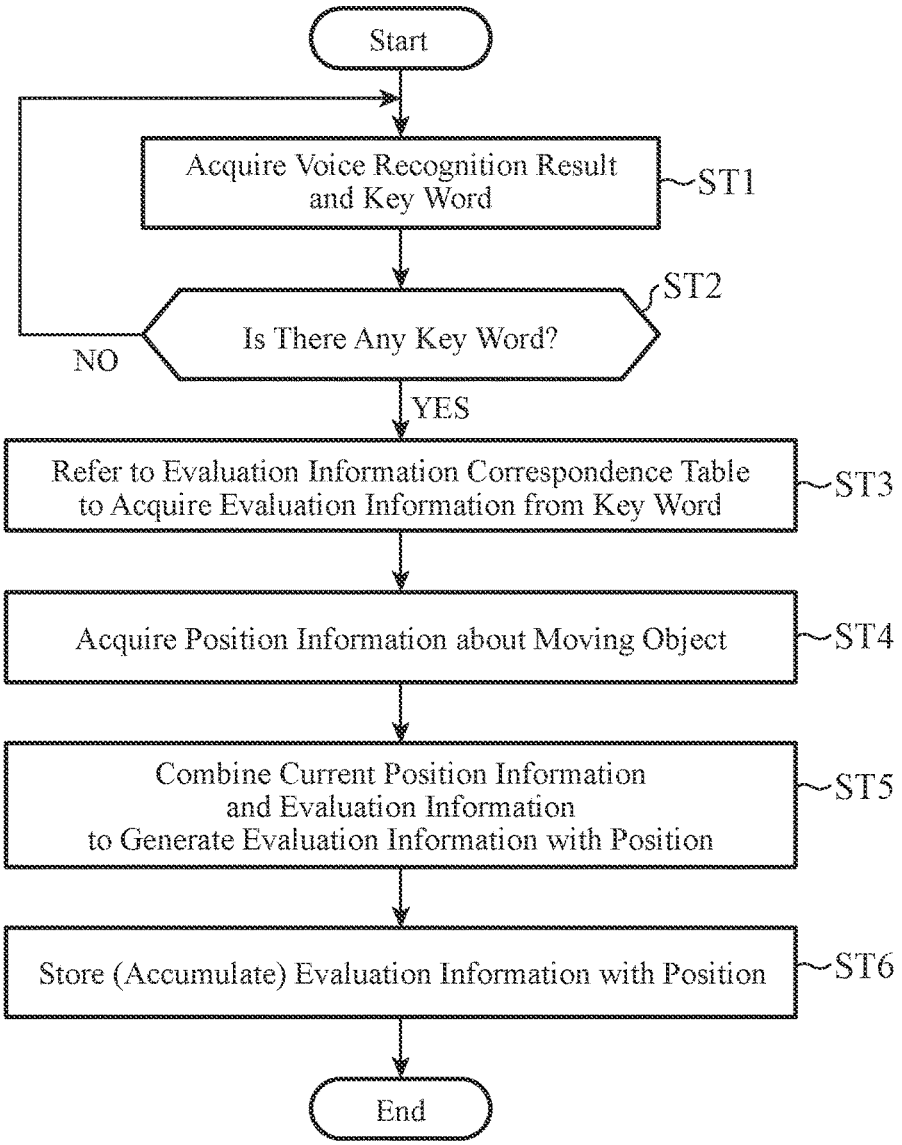
FIG. 2 is an example of an evaluation information correspondence table in which each of key words is brought into correspondence with evaluation information.
FIG. 3 is a flowchart showing an operation at the time of registration of evaluation information with position which is performed by the navigation system in accordance with Embodiment 2.

As shown in FIG. 2, the following key words: "beautiful", "wide", "easy to drive", and . . . are brought into correspondence with an evaluation of "good", and the following key words: "dirty", "narrow", "hard to drive", and . . . are brought into correspondence with an evaluation of "bad." For example, when a user's utterance is recognized and the key word "beautiful" is included in the result of the recognition, the evaluation information acquiring unit 5 refers to the evaluation information correspondence table 6 to acquire the corresponding evaluation information of "good." As a result, it is determined that the above-mentioned utterance corresponds to an act of making an evaluation of "good." Hereafter, an explanation will be made by assuming that one of the following two types of evaluations: "good" and "bad" is provided as each evaluation information.

The position-cum-evaluation information generator 8 combines the evaluation information acquired by the evaluation information acquiring unit 5 and the current position information of the vehicle (the moving object) received from the vehicle-mounted device 100 and acquired by the current position acquiring unit 7, to generate evaluation information with position, and sends the evaluation information with position to the position-cum-evaluation information storage 9.

More specifically, the evaluation information with position generated and sent thereto by the position-cum-evaluation information generator 8 is stored and accumulated in the position-cum-evaluation information storage 9.

The display controller 11 newly generates map data with evaluation information by adding predetermined evaluation information with position stored in the position-cum-evaluation information storage 9 to map data stored in the map data storage 12 which will be described below, and displays the map data with evaluation information on the display (a display screen). As a display area of the map, an area in the vicinity of the position of the vehicle (the moving object) can be displayed, like that of a typical car navigation system, or an area in the vicinity of an arbitrary point specified by a user can be displayed, and the scale can be varied arbitrarily.

In the map data storage 12, for example, map data, such as road data, intersection data and facility data, are stored in, for example, a medium, such as a DVD-ROM, a hard disk or an SD card. Although the explanation is made by assuming that the server 101 for navigation includes this map data storage 12, a map data acquiring unit (not shown) that exists on a network and can acquire map data information, such as road data, via a communication network can be used instead of the map data storage 12. The same goes for the following embodiments.

Next, the operation of the navigation system in accordance with Embodiment 1 configured as above will be explained. In order to illustrate the operation plainly, a process at the time of registration of evaluation information with position and a process at the time of use of evaluation information with position will be described separately.

Figure 4:
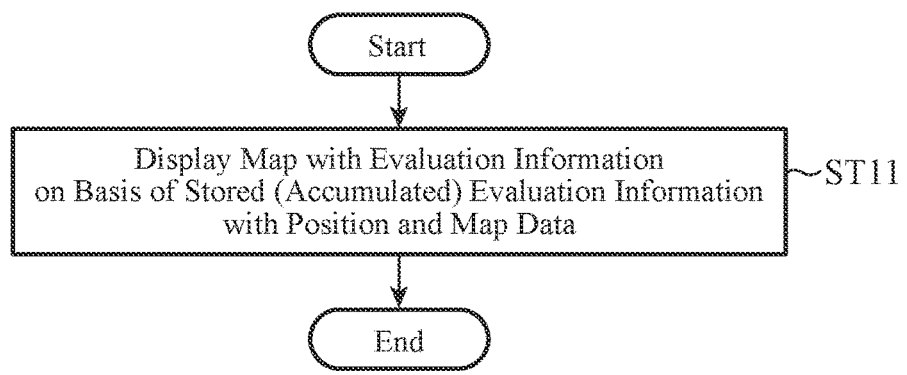
FIG. 4 is a flowchart showing an operation at the time of use of evaluation information with position which is performed by the navigation system in accordance with Embodiment 1.

FIG. 3 is a flow chart showing the operation at the time of registration of evaluation information with position which is performed by the navigation system in accordance with Embodiment 1. Further, FIG. 4 is a flow chart showing the operation at the time of use of evaluation information with position which is performed by the navigation system in accordance with Embodiment 1. Because these two processes are regularly carried out in parallel, users do not consciously discriminate between them. The same goes for the following embodiments.

First, operations in the vehicle-mounted device 100 will be explained.

In the vehicle-mounted device 100, the sound acquiring unit 1 acquires a sound inputted from the microphone, and A/D converts the sound to acquire a sound signal in, for example, a PCM form. Next, the utterance section detector 2 detects an utterance section from the sound signal acquired by the sound acquiring unit 1 and extracts voice data. The voice recognizer 3 then performs recognition on the voice data extracted by the utterance section detector 2 by using the voice recognition dictionary 4, and extracts a key word included in the result of the recognition.

Further, the current position acquiring unit 7 acquires position information about the current position of the vehicle (the moving object) on the basis of information from the position sensor.

Next, operations at the time of registration in the server for navigation 101 will be explained by referring to FIG. 3.

The server for navigation 101 acquires the recognition result of performing the voice recognition in the vehicle-mounted device 100, and the key word included in the recognition result (step ST1). At that time, when no key word is included in the recognition result (when NO in step ST2), the server for navigation returns to step ST1 and repeats the process.

In contrast, when a keyword is included in the recognition result (when YES in step ST2), the evaluation information acquiring unit 5 refers to the evaluation information correspondence table 6 to acquire evaluation information corresponding to the above-mentioned key word (step ST3).

Further, the server for navigation 101 receives and acquires, via a receiver (not shown), the position information about the current position of the vehicle (the moving object) which the current position acquiring unit 7 of the vehicle-mounted device 100 has acquired on the basis of the information from the position sensor (step ST4).

The position-cum-evaluation information generator 8 then combines the evaluation information acquired in step ST3 and the current position information acquired in step ST4, to generate evaluation information with position (step ST5), and sends this evaluation information with position to the position-cum-evaluation information storage 9, so that the evaluation information with position is stored in the position-cum-evaluation information storage 9 (step ST6). More specifically, together with the evaluation information acquired in step ST3, the point for which the evaluation has been made is stored while being linked with the evaluation information.

As mentioned above, because the vehicle-mounted device 100 is configured in such a way as to regularly perform recognition on a user's utterance, the vehicle-mounted device repeats the series of processes at the time of registration by restarting the process, in step ST1, of acquiring the recognition result and a key word so as to prepare for the user's next utterance.

Next, operations at the time of use will be explained. FIG. 4 is a flow chart showing the operation at the time of use of evaluation information with position which is performed by the server for navigation 101 in accordance with Embodiment 1.

The display controller 11 causes display of a map with evaluation information on the display screen of the display (the display unit) 10 of the vehicle-mounted device 100 on the basis of both map data stored in the map data storage 12 in advance, and evaluation information with position which is stored, in step ST7 of FIG. 3, in the position-cum-evaluation information storage 9, more specifically, by adding predetermined evaluation information with position stored in the position-cum-evaluation information storage 9 to map data stored in the map data storage 12 (step ST11).

Figure 5:
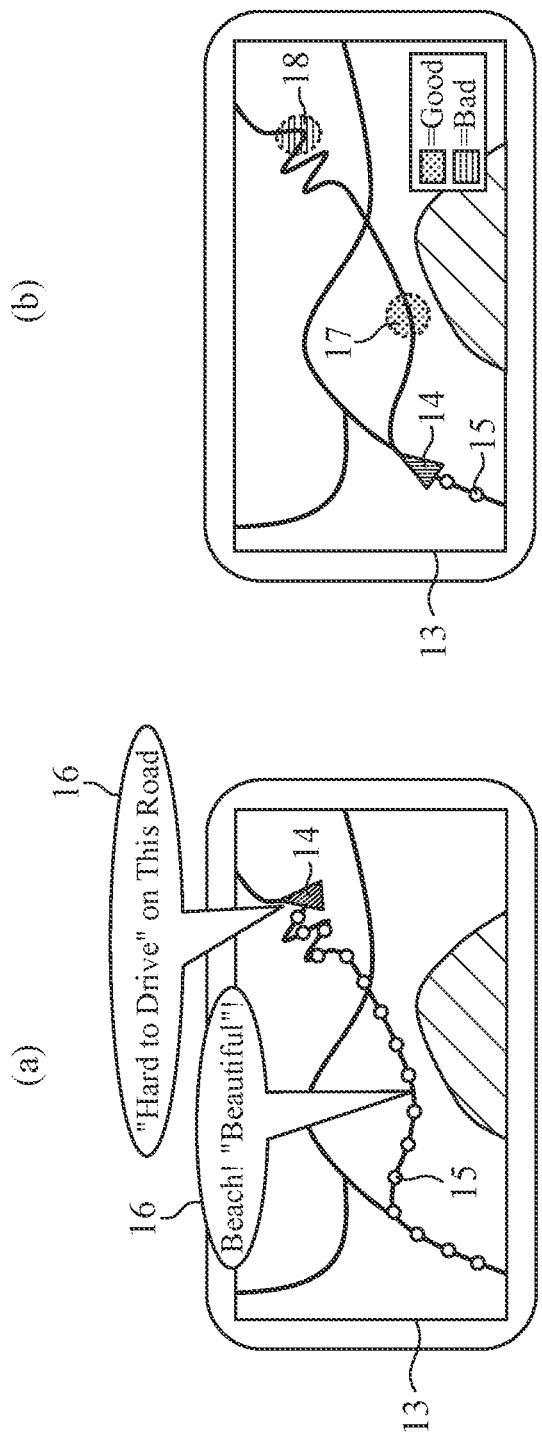
FIG. 5 is an explanatory drawing showing a concrete example of an operation at the time of registration (a) and an operation at the time of use (b) which are performed by the navigation system in accordance with Embodiment 1.

Hereafter, an explanation will be made by providing a concrete example. FIG. 5 is an explanatory drawing showing a concrete example of the operation at the time of registration (a) and the operation at the time of use (b) which are performed by the navigation system in accordance with Embodiment 1. In FIG. 5(*a*), on the map displayed on the display screen 13 of the display (the display unit) 10 of the vehicle-mounted device 100, a plurality of path marks 15 showing the traveling path of the vehicle (the moving object), and a balloon 16 showing the contents of a user's utterance at each point are illustrated in a state in which a vehicle mark 14 showing the position of the vehicle (the moving object) is displayed. A hatched part in a central lower portion of the display screen 13 shows an ocean.

In this embodiment, for the sake of explanation, a state (FIG. 5(*b*)) of using evaluation information registered in FIG. 5(*a*) several days later is assumed.

First, the operation at the time of registration will be explained concretely by referring to FIG. 5(*a*). At the same time when the vehicle-mounted device 100 is started, a sound input is started by the sound acquiring unit 1. For example, when a user looks at a beach by which he or she has passed and then utters "Beach, beautiful", voice data about this utterance section is acquired by the utterance section detector 2. The voice recognizer 3 then performs recognition on the voice data about that sound section and refers to the voice recognition dictionary 4, and extracts a key word "beautiful" on the basis of the recognition result of "Beach, beautiful."

The server for navigation 101 acquires this recognition result and the key word "beautiful" from the vehicle-mounted device 100 (step ST1, when YES in step ST2). The evaluation information acquiring unit 5 then refers to the evaluation information correspondence table 6 as shown in FIG. 2 to acquire the evaluation information of "good" corresponding to the key word "beautiful" (step ST3).

Further, the point where the above-mentioned utterance is made is acquired by the current position acquiring unit 7 of the vehicle-mounted device 100 (step ST4), and the position-cum-evaluation information generator 8 combines that current position information with the evaluation information of "good" to generate evaluation information with position such as "east longitude of 135.12 degrees and north latitude of 34.41 degrees="good"" (step ST5), and stores this evaluation information with position in the position-cum-evaluation information storage 9 (step ST6).

After that, for example, when the user utters "This road is hard to drive" or the like while passing along a road having many curves, the position-cum-evaluation information generator newly generates evaluation information with position in the same way, and stores this evaluation information with position in the position-cum-evaluation information storage 9 (steps ST1 to ST6). In this case, because a key word included in the recognition result is "hard to drive", the evaluation information is "bad."

Next, the operation at the time of use will be explained concretely by referring to FIG. 5(*b*). It is assumed that for example, the user will pass through the vicinity of a point, about which evaluation information has been registered, again several days later, as mentioned above. Then, when a map (FIG. 5(*b*)) including points about each of which already registered evaluation information with position has been registered is displayed on the screen, a command to superimpose and display, for example, regions (17, 18) each of which is centered at a point about which evaluation information with position has been registered and has a fixed area, and to each of which a color or the like according to the type of the evaluation information is applied on the map is issued (step ST11). The navigation system can be configured in such a way as to make it possible to refer to the evaluation information at the time of a route setting to a destination by using the key input unit.

As a result, for example, when the vehicle (the moving object) 14 is travelling before a branch point where the road branches into right-hand side and left-hand side roads, as shown in FIG. 5(*b*), the user can confirm that the region 17 showing the evaluation information of "good" is displayed on the right-hand side road, feel strongly that "the right-hand side road looks good", and select the right-hand side road without hesitating at the branch point. Further, because the region 18 showing the evaluation information of "bad" is displayed ahead of the former region, the user can select a road bypassing the region at the next branch point and drive comfortably.

By doing in this way, the navigation system can save information about a road along which the user desires to pass again, information about a road along which the user does not desire to pass anymore, etc. without having to make the user operate intentionally, the navigation system can support the user's comfortable driving by, for example, preventing the user from repeating the same failure at the time of making a route selection, etc.

Figure 6:
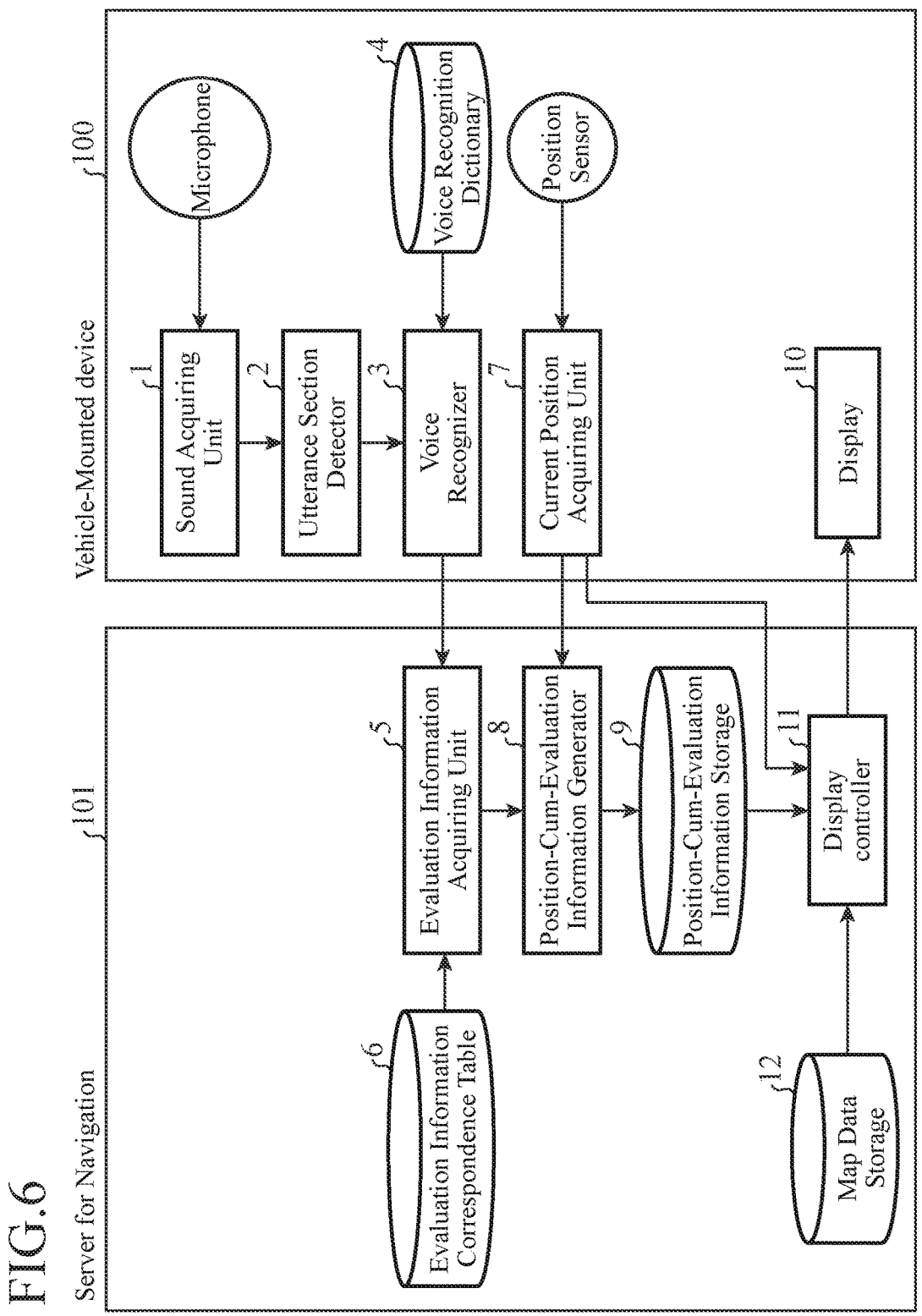
FIG. 6 is a block diagram showing another example of the navigation system in accordance with Embodiment 1.

Further, as shown in FIG. 6, the current position information which the current position acquiring unit 7 of the vehicle-mounted device 100 has acquired can be inputted also to the display controller 11. In this case, at the time of use of evaluation information with position, the display controller 11 can display map data to which evaluation information with position is added on the display on the basis of both the current position acquired from the vehicle-mounted device 100 and the evaluation information with position stored in the position-cum-evaluation information storage 9 when the user passes through the point or the region about which the above-mentioned evaluation information with position has been registered, or its neighborhood (for example, it is preferable that a certain threshold, such as 50 m or less from the point or the region, is determined, or the user is enabled to specify the threshold), or only when it is already seen from the set route or the like that the user will pass through (the user is scheduled to pass through) the point or the region, or its neighborhood.

By doing in this way, the navigation system can prevent unnecessary information from being also presented to the user, thereby avoiding discomfort from being provided for the user.

At the time of presentation, the navigation system can sound by voice or by generating a sound effect according to the descriptions of the evaluation information with position and the position by using the above-mentioned sound outputter (not shown), thereby calling more understandable attention to the user.

Further, although the example in which a region to which a color or the like (a color, a pattern, or the like) according to evaluation information is applied is superimposed and displayed on the map is shown in this Embodiment 1, another method can be used as the method of displaying an object on the map according to evaluation information, and evaluation information can be presented to the user by using a graphic, an image such as an icon, characters, or the like. Further, to an area, such as a prefecture, a city, ward, town, or village, or an address, including a point about which evaluation information with position has been registered, a region according to the evaluation information can be assigned.

Figure 7:
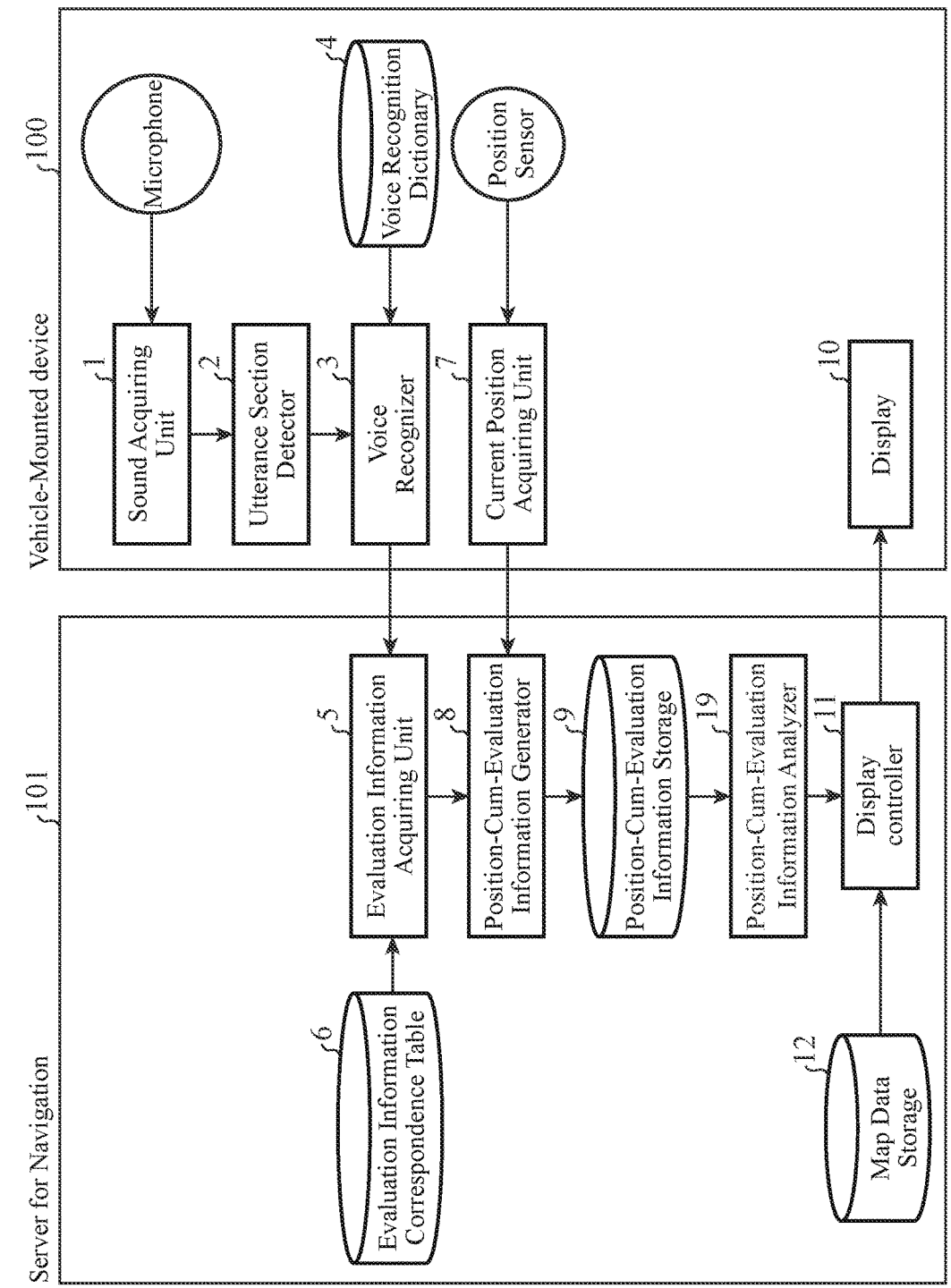
FIG. 7 is a block diagram showing a further example of the navigation system in accordance with Embodiment 1.

The server for navigation can further include a position-cum-evaluation information analyzer 19 that analyzes the number of pieces of evaluation information with position stored in the position-cum-evaluation information storage 9, as shown in FIG. 7. In this case, at the time of use of evaluation information with position, the display controller 11 can display map data to which evaluation information with position is added while changing the presenting method on the basis of an analysis result acquired by the position-cum-evaluation information analyzer 19, more specifically, by taking into consideration the number of pieces of evaluation information with position, which is the result of the analysis, registered for each identical point or each identical region.

For example, by deepening the color, enlarging the characters, or the like with increase in the number, the display controller presents the evaluation information with position noticeably in such a way that it is easy for the user to notice the evaluation information with position. Further, when different pieces of evaluation information with position are registered for an identical point or an identical region, one of these pieces of evaluation information with position whose number is the largest is presented. As an alternative, the pieces of evaluation information with position can be presented in intermediate representations according to their numbers.

As a result, the navigation system can make points where evaluations have been made concentratedly (points which seem to have a high use value) easily receive attention from the user.

As mentioned above, because the server for navigation in accordance with this Embodiment 1 automatically acquires evaluation information about a point or a region from both a recognition result acquired by regularly performing recognition on the contents of a user's utterance, and the position information acquired by the position sensor, and registers the evaluation information, the server for navigation can leave an impression (an evaluation) about the point or the region automatically and safely without requiring the user's special operation. Further, by adding the evaluation information to map data and causing display of this map data at the time of use, the server for navigation enables the user to revisit a point through which the user desires to pass once again, bypass a point through which the user desires to never pass again, and so on without requiring the user's work of consciously memorizing the impression about each point and so on, thereby being able to support the user's comfortable movement.

Embodiment 2

Figure 8:
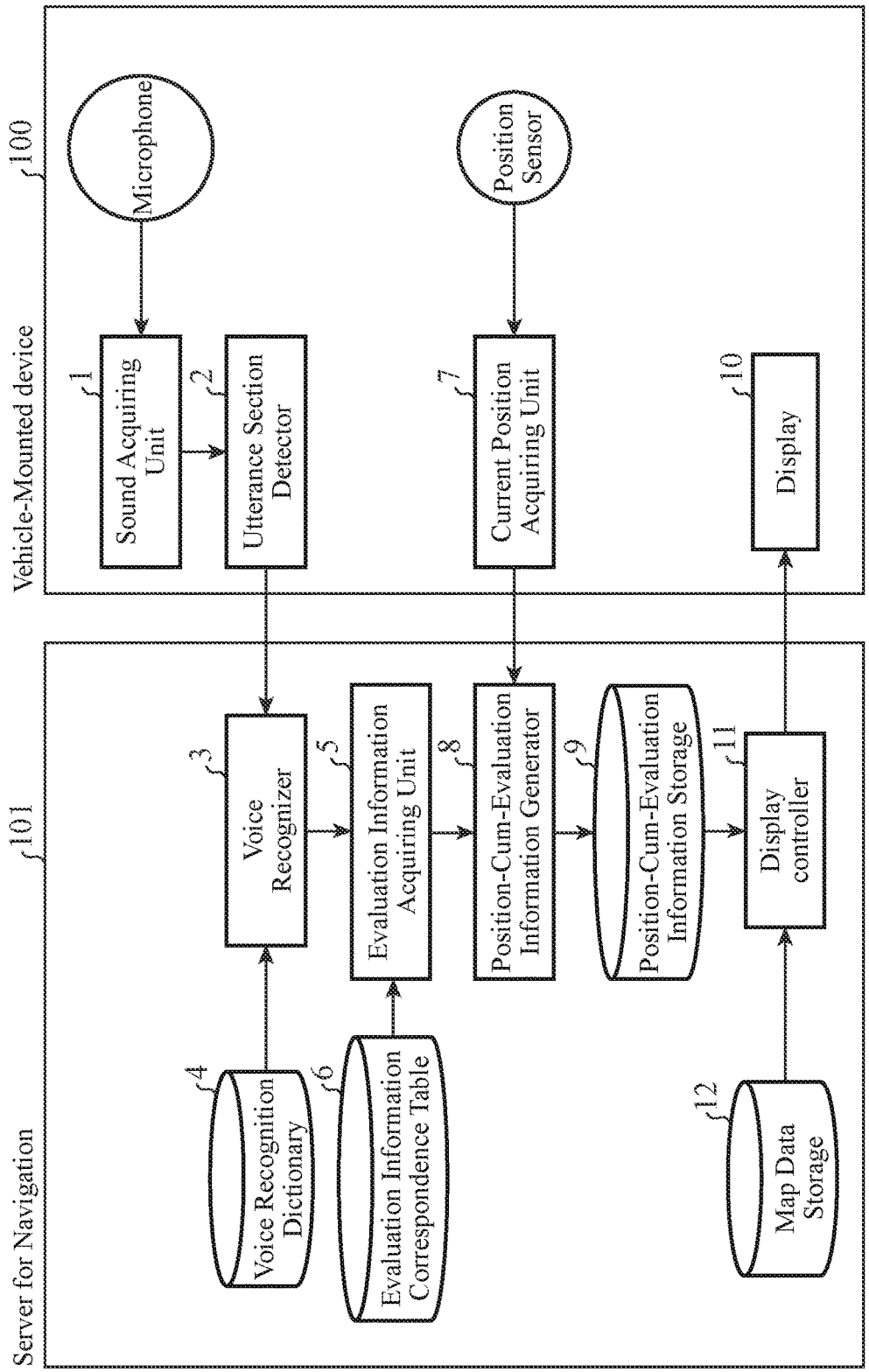
FIG. 8 is a block diagram showing an example of a navigation system in accordance with Embodiment 2.

FIG. 8 is a block diagram showing an example of a navigation system in accordance with Embodiment 2 of the present invention. The same structural components as those explained in Embodiment 1 are designated by the same reference numerals, and the duplicated explanation of the components will be omitted hereafter. In the navigation system in accordance with Embodiment 2, which will be shown below, a vehicle-mounted device 100 includes a sound acquiring unit 1, an utterance section detector 2, a current position acquiring unit 7 and a display (a display unit) 10, and a server for navigation 101 includes a voice recognizer 3, a voice recognition dictionary 4, an evaluation information acquiring unit 5, an evaluation information correspondence table 6, a position-cum-evaluation information generator 8, a position-cum-evaluation information storage 9, a display controller 11 and a map data storage 12, as compared with the navigation system in accordance with Embodiment 1.

First, operations in the vehicle-mounted device 100 will be explained.

In the vehicle-mounted device 100, the sound acquiring unit 1 acquires a sound inputted from a microphone, and A/D converts the sound to acquire a sound signal in, for example, a PCM form. Next, the utterance section detector 2 detects an utterance section from the sound signal acquired by the sound acquiring unit 1 and extracts voice data.

Further, the current position acquiring unit 7 acquires position information about the current position of a vehicle (a moving object) on the basis of information from a position sensor.

Figure 9:
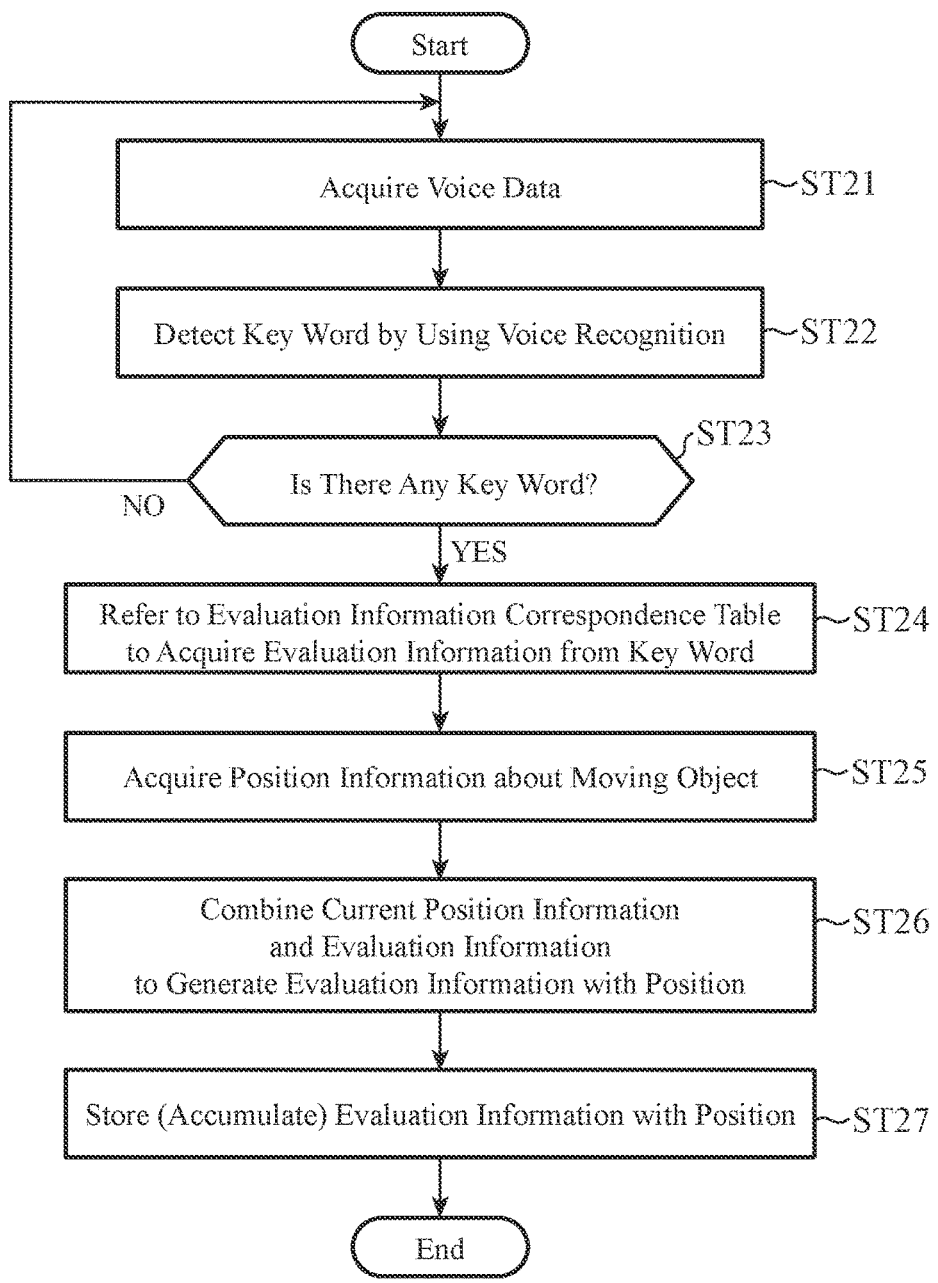
FIG. 9 is a flow chart showing an operation at the time of registration of evaluation information with position which is performed by the navigation system in accordance with Embodiment 2.

Next, the operation of the navigation system in accordance with Embodiment 2 configured as above will be explained. FIG. 9 is a flow chart showing the operation at the time of registration of evaluation information with position which is performed by the server for navigation 101 in accordance with Embodiment 2. Because the operation at the time of use is the same as that shown in FIG. 4 in Embodiment 1, an illustration and an explanation of the operation will be omitted hereafter.

The server for navigation 101 acquires the voice data extracted in the vehicle-mounted device 100 via a receiver (not shown) (step ST21). Then, the voice recognizer 3 performs recognition on the acquired voice data by using the voice recognition dictionary 4, and detects a key word included in a recognition result (step ST22). At that time, when no key word is included in the recognition result (when NO in step ST23), the server for navigation returns to step ST21 and performs the above-mentioned processes of steps ST21 and ST22 again.

In contrast, when a key word is included in the recognition result (when YES in step ST23), the evaluation information acquiring unit 5 refers to the evaluation information correspondence table 6 to acquire evaluation information corresponding to the above-mentioned key word (step ST24).

Further, the server for navigation 101 receives and acquires, via the receiver (not shown), the position information about the current position of the vehicle (the moving object) which the current position acquiring unit 7 of the vehicle-mounted device 100 has acquired on the basis of the information from the position sensor (step ST25).

The position-cum-evaluation information generator 8 then combines the evaluation information acquired in step ST24 and the current position information acquired in step ST25, to generate evaluation information with position (step ST26), and sends this evaluation information with position to the position-cum-evaluation information storage 9, so that the evaluation information with position is stored in the position-cum-evaluation information storage 9 (step ST27). More specifically, together with the evaluation information acquired in step ST24, the point on which the evaluation has been made is stored while being linked with the evaluation information.

Like in the case of Embodiment 1, because the vehicle-mounted device 101 is configured in such a way as to regularly perform recognition on a user's utterance, the vehicle-mounted device repeats the series of processes at the time of registration by restarting the process, in step ST21, of acquiring voice data so as to prepare for the user's next utterance.

Figure 10:
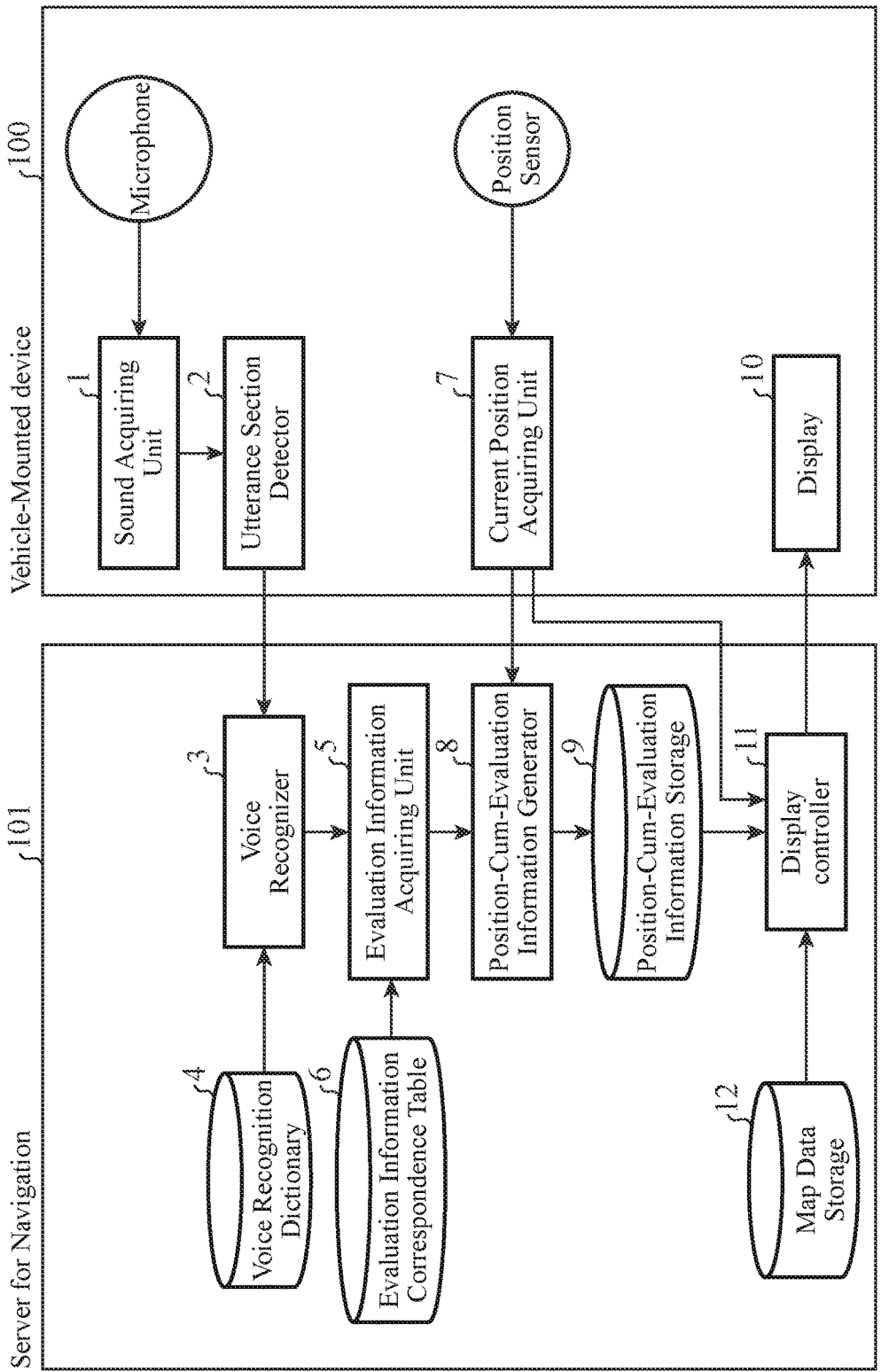
FIG. 10 is a block diagram showing another example of the navigation system in accordance with Embodiment 2.

Further, as shown in FIG. 10, the current position information which the current position acquiring unit 7 of the vehicle-mounted device 100 has acquired can be inputted also to the display controller 11. In this case, at the time of use of evaluation information with position, the display controller 11 can display map data to which evaluation information with position is added on the display on the basis of both the current position acquired from the vehicle-mounted device 100 and the evaluation information with position stored in the position-cum-evaluation information storage 9 when the user passes through the point or the region about which the above-mentioned evaluation information with position has been registered, or its neighborhood (for example, it is preferable that a certain threshold, such as 50 m or less from the point or the region, is determined, or the user is enabled to specify the threshold), or only when it is already seen from the set route or the like that the user will pass through (the user is scheduled to pass through) the point or the region, or its neighborhood.

By doing in this way, the navigation system can prevent unnecessary information from being also presented to the user, thereby avoiding discomfort from being provided for the user.

At the time of presentation, the navigation system can sound by voice or by generating a sound effect according to the descriptions of the evaluation information with position and the position by using such a sound outputter as above (not shown), thereby calling more understandable attention to the user.

Further, although the example in which a region to which a color or the like (a color, a pattern, or the like) according to the evaluation information is applied is superimposed and displayed on the map is shown also in this Embodiment 2, another method can be used as the method of displaying an object on the map according to the evaluation information, and the evaluation information can be presented to the user by using a graphic, an image such as an icon, characters, or the like. Further, to an area, such as a prefecture, a city, ward, town, or village, or an address, including the point about which the evaluation information with position has been registered, a region according to the evaluation information can be assigned.

Figure 11:
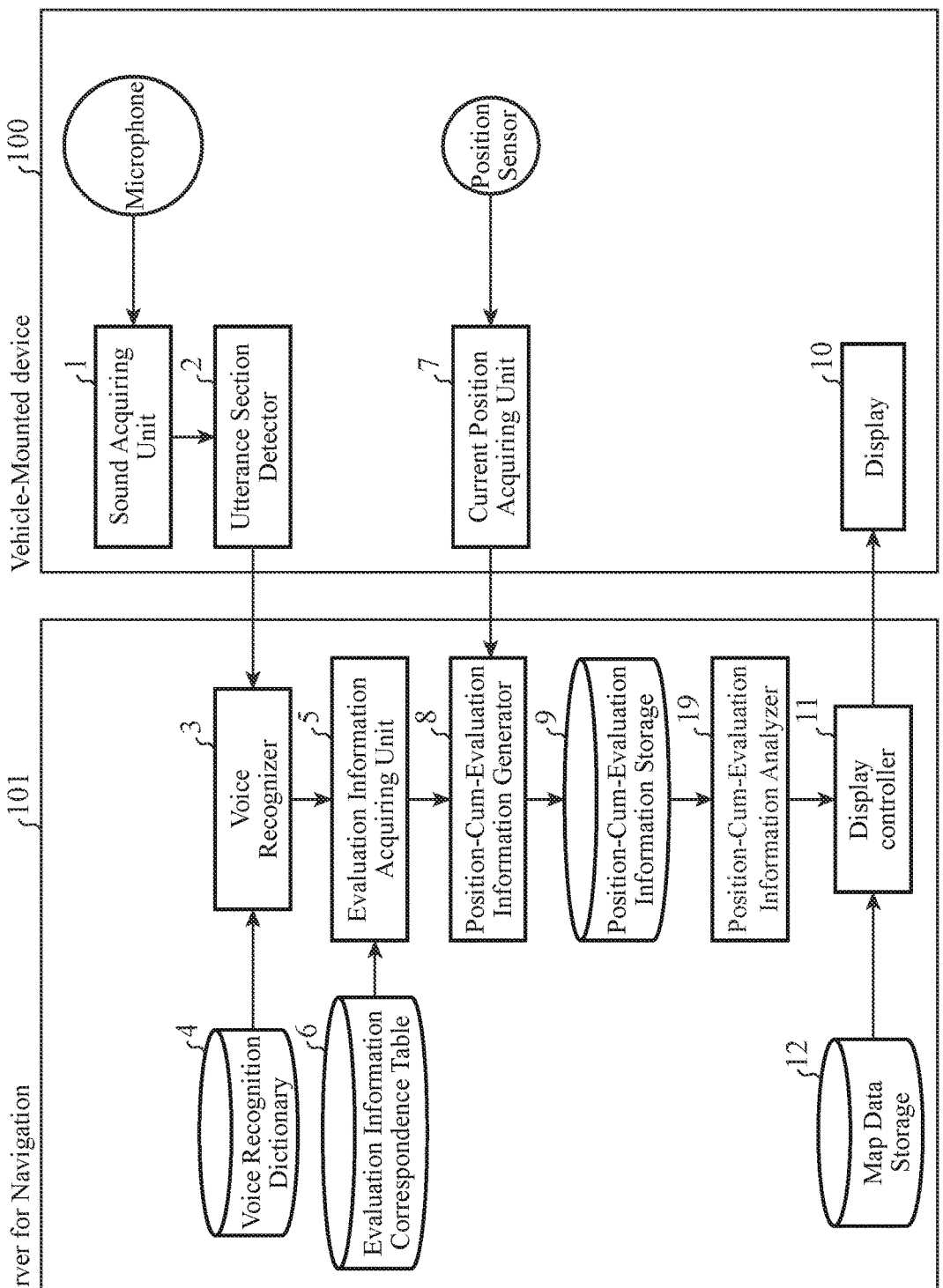
FIG. 11 is a block diagram showing a further example of the navigation system in accordance with Embodiment 2.

The server for navigation can further include a position-cum-evaluation information analyzer 19 that analyzes the number of pieces of evaluation information with position stored in the position-cum-evaluation information storage 9, as shown in FIG. 11. In this case, at the time of use of evaluation information with position, the display controller 11 can display map data to which the evaluation information with position is added while changing the presenting method on the basis of an analysis result acquired by the position-cum-evaluation information analyzer 19, more specifically, by taking into consideration the number of pieces of evaluation information with position, which is the result of the analysis, registered for each identical point or each identical region.

For example, by deepening the color, enlarging the characters, or the like with increase in the number, the display controller presents the evaluation information with position noticeably in such a way that it is easy for the user to notice the evaluation information with position. Further, when different pieces of evaluation information with position are registered for an identical point or an identical region, one of these pieces of evaluation information with position whose number is the largest is presented. As an alternative, the pieces of evaluation information with position can be presented in intermediate representations according to their numbers.

As a result, the navigation system can make points where evaluations have been made concentratedly (points which seem to have a high use value) easily receive attention from the user.

As mentioned above, because the server for navigation in accordance with this Embodiment 2 automatically acquires evaluation information about a point or a region from both a recognition result acquired by regularly performing recognition on the contents of a user's utterance, and the position information acquired by the position sensor, and registers the evaluation information, like that in accordance with Embodiment 1, the server for navigation can leave an impression (an evaluation) about the point or the region automatically and safely without requiring the user's special operation. Further, by adding the evaluation information to map data and causing display of this map data at the time of use, the server for navigation enables the user to revisit a point through which the user desires to pass once again, bypass a point through which the user desires to never pass again, and so on without requiring the user's work of consciously memorizing the impression about each point and so on, thereby being able to support the user's comfortable movement.

Embodiment 3

Figure 12:
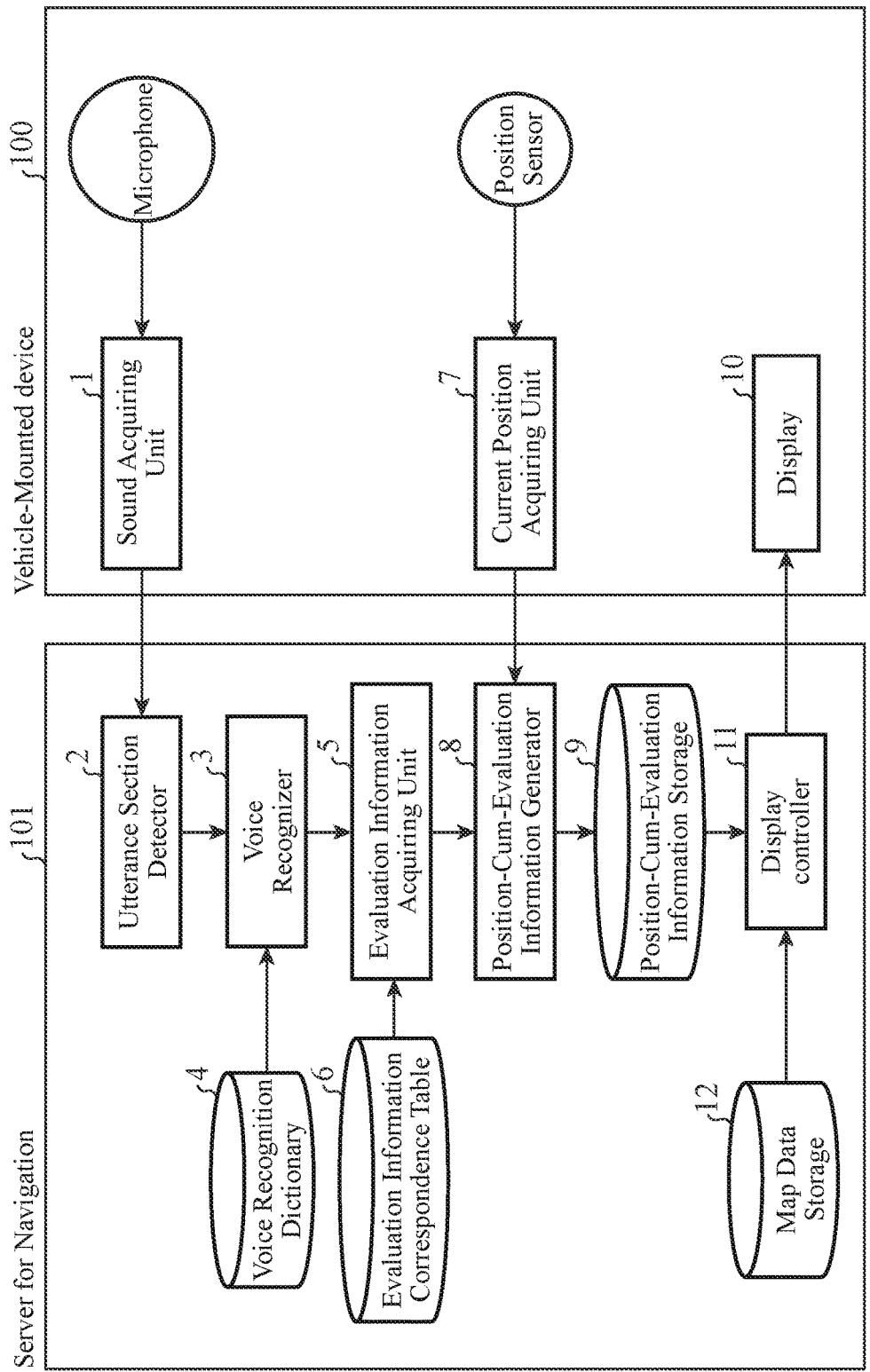
FIG. 12 is a block diagram showing an example of a navigation system in accordance with Embodiment 3.

FIG. 12 is a block diagram showing an example of a navigation system in accordance with Embodiment 3 of the present invention. The same structural components as those explained in Embodiments 1 and 2 are designated by the same reference numerals, and the duplicated explanation of the components will be omitted hereafter. In the navigation system in accordance with Embodiment 3 which will be shown below, a vehicle-mounted device 100 includes a sound acquiring unit 1, a current position acquiring unit 7 and a display (a display unit) 10, and a server for navigation 101 includes an utterance section detector 2, a voice recognizer 3, a voice recognition dictionary 4, an evaluation information acquiring unit 5, an evaluation information correspondence table 6, a position-cum-evaluation information generator 8, a position-cum-evaluation information storage 9, a display controller 11 and a map data storage 12, as compared with the navigation systems in accordance with Embodiments 1 and 2.

Figure 13:
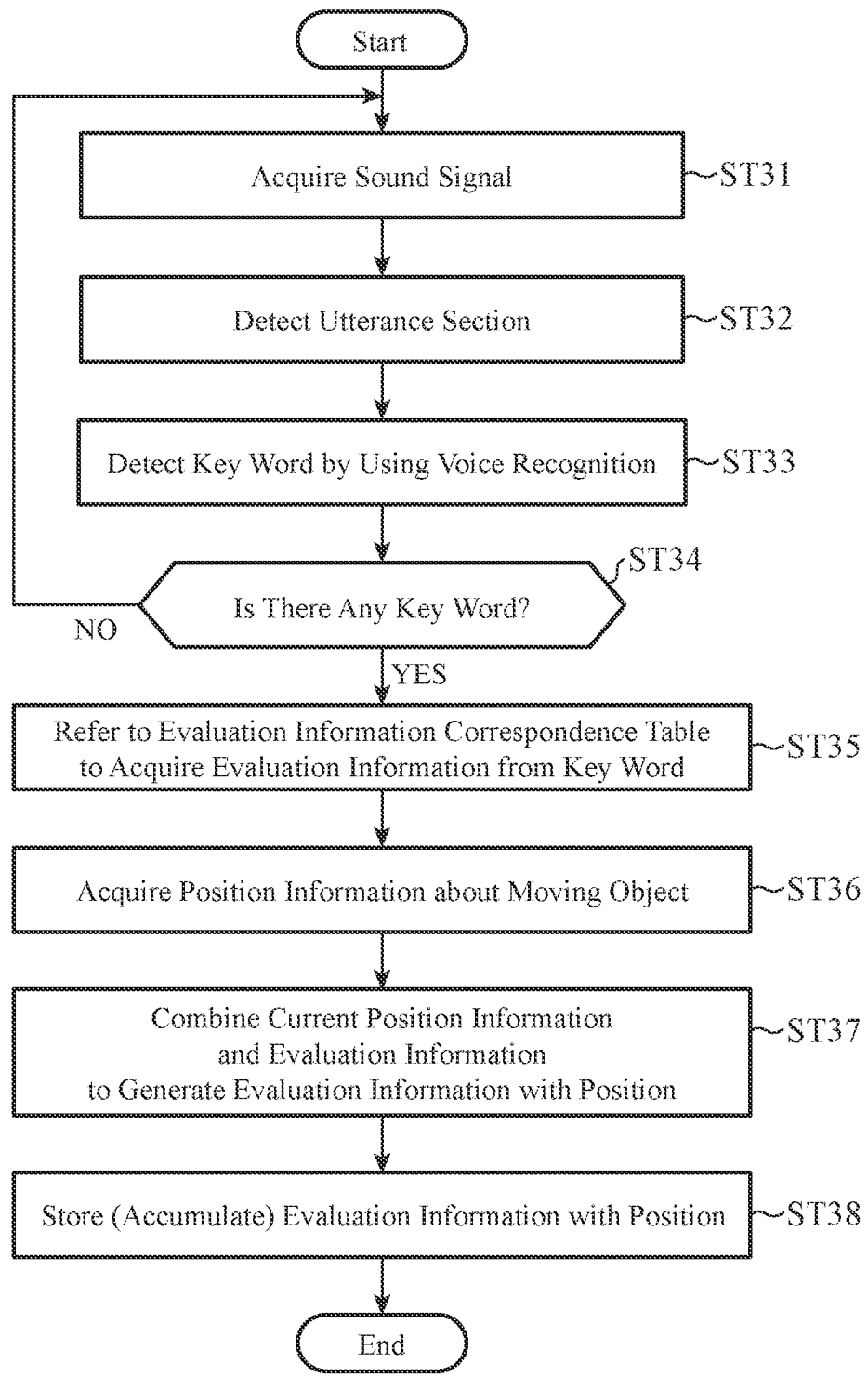
FIG. 13 is a flow chart showing an operation at the time of registration of evaluation information with position which is performed by the navigation system in accordance with Embodiment 3.

Next, the operation of the navigation system in accordance with Embodiment 3 configured as above will be explained. FIG. 13 is a flow chart showing the operation at the time of registration of evaluation information with position which is performed by the server for navigation 101 in accordance with Embodiment 3. Because the operation at the time of use is the same as that shown in FIG. 4 in Embodiment 1, an illustration and an explanation of the operation will be omitted hereafter.

The server for navigation 101 acquires a sound signal acquired in the vehicle-mounted device 100 via a receiver (not shown) (step ST31). The utterance section detector 2 then detects an utterance section from the sound signal acquired by the sound acquiring unit 1 and extracts voice data (step ST32).

Next, the voice recognizer 3 performs recognition on the acquired voice data by using the voice recognition dictionary 4, and detects a key word included in a recognition result (step ST33). At that time, when no key word is included in the recognition result (when NO in step ST34), the server for navigation returns to step ST31 and performs the above-mentioned processes of steps ST31 to ST33 again.

In contrast, when a key word is included in the recognition result (when YES in step ST34), the evaluation information acquiring unit 5 refers to the evaluation information correspondence table 6 to acquire evaluation information corresponding to the above-mentioned key word (step ST35).

Further, the server for navigation 101 receives and acquires, via the receiver (not shown), the position information about the current position of a vehicle (a moving object) which the current position acquiring unit 7 of the vehicle-mounted device 100 has acquired on the basis of information from a position sensor (step ST36).

The position-cum-evaluation information generator 8 then combines the evaluation information acquired in step ST35 and the current position information acquired in step ST36, to generate evaluation information with position (step ST37), and sends this evaluation information with position to the position-cum-evaluation information storage 9, so that the evaluation information with position is stored in the position-cum-evaluation information storage 9 (step ST38). More specifically, together with the evaluation information acquired in step ST35, the point on which the evaluation has been made is stored while being linked with the evaluation information.

Like in the case of Embodiments 1 and 2, because the vehicle-mounted device 101 is configured in such a way as to regularly perform recognition on a user's utterance, the vehicle-mounted device repeats the series of processes at the time of registration by restarting the process, in step ST31, of acquiring a sound signal so as to prepare for the user's next utterance.

Figure 14:
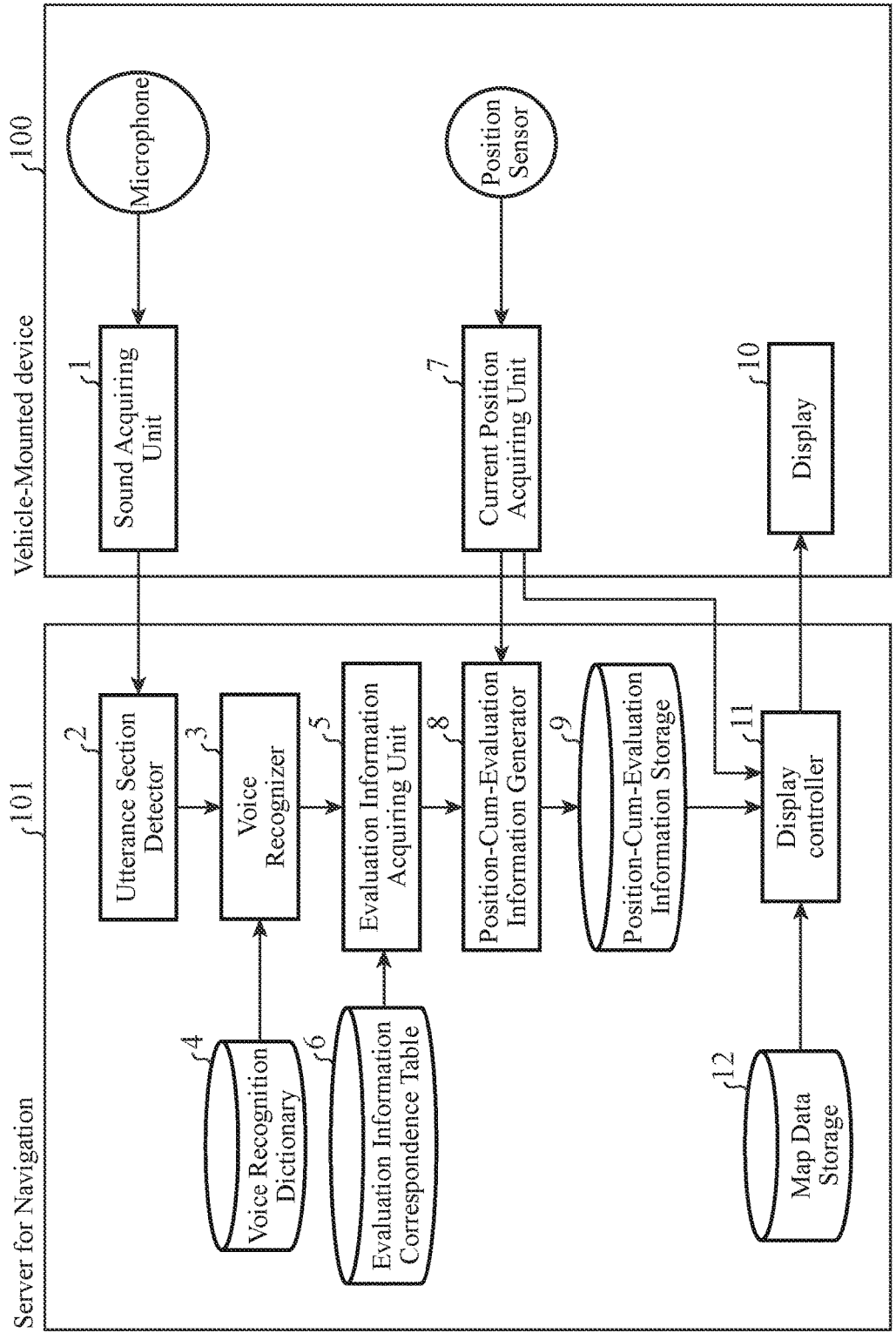
FIG. 14 is a block diagram showing another example of the navigation system in accordance with Embodiment 3.

Further, as shown in FIG. 14, the current position information which the current position acquiring unit 7 of the vehicle-mounted device 100 has acquired can be inputted also to the display controller 11. In this case, at the time of use of evaluation information with position, the display controller 11 can display map data to which the evaluation information with position is added on the display on the basis of both the current position acquired from the vehicle-mounted device 100 and the evaluation information with position stored in the position-cum-evaluation information storage 9 when the user passes through the point or the region about which the above-mentioned evaluation information with position has been registered, or its neighborhood (for example, it is preferable that a certain threshold, such as 50 m or less from the point or the region, is determined, or the user is enabled to specify the threshold), or only when it is already seen from the set route or the like that the user will pass through (the user is scheduled to pass through) the point or the region, or its neighborhood.

By doing in this way, the navigation system can prevent unnecessary information from being also presented to the user, thereby avoiding discomfort from being provided for the user.

At the time of presentation, the navigation system can sound by voice or by generating a sound effect according to the descriptions of the evaluation information with position and the position by using such a sound outputter as above (not shown), thereby calling more understandable attention to the user.

Further, although the example in which a region to which a color or the like (a color, a pattern, or the like) according to the evaluation information is applied is superimposed and displayed on the map is shown also in this Embodiment 3, another method can be used as the method of displaying an object on the map according to the evaluation information, and the evaluation information can be presented to the user by using a graphic, an image such as an icon, characters, or the like. Further, to an area, such as a prefecture, a city, ward, town, or village, or an address, including the point about which the evaluation information with position has been registered, a region according to the evaluation information can be assigned.

Figure 15:
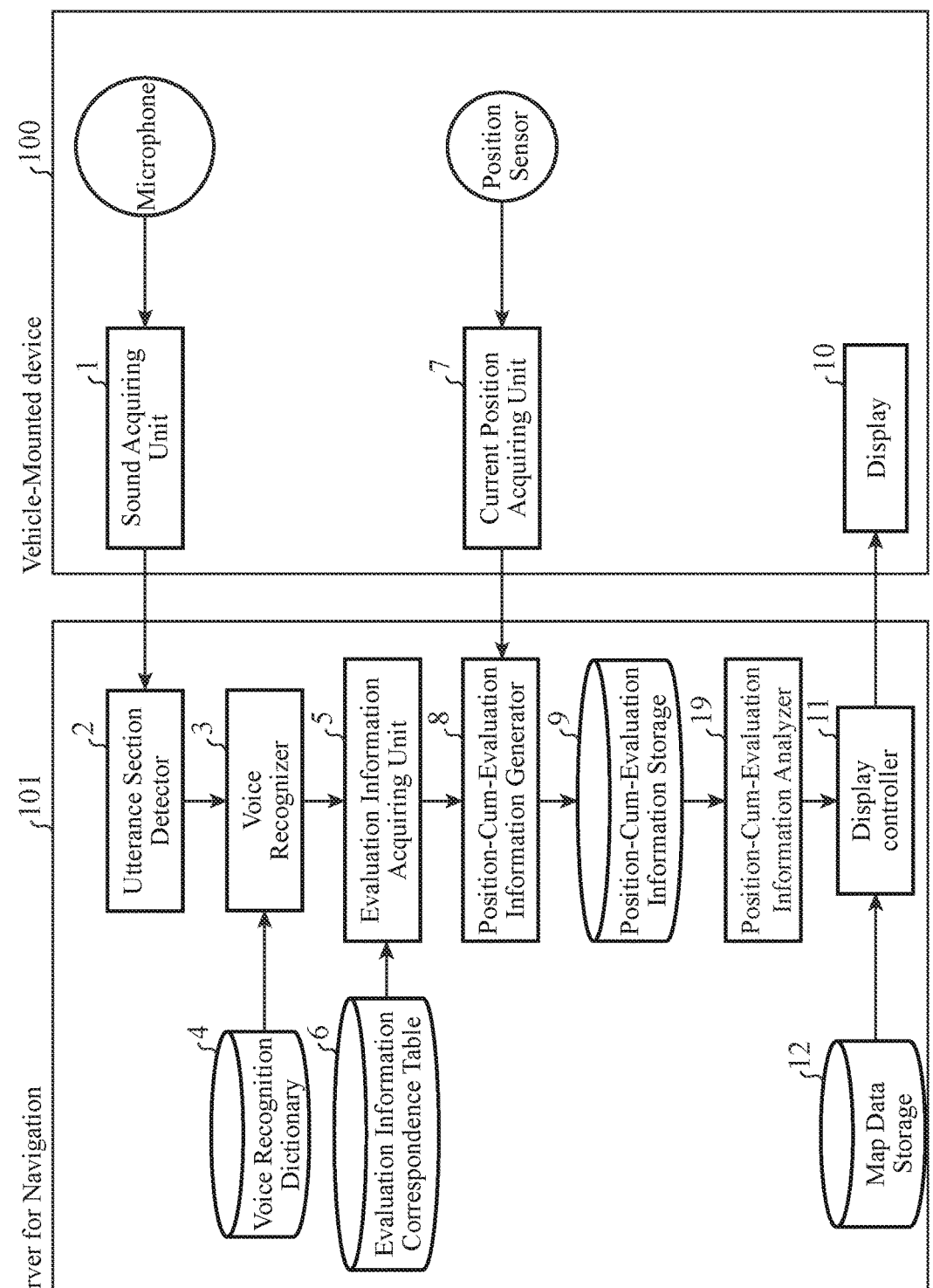
FIG. 15 is a block diagram showing a further example of the navigation system in accordance with Embodiment 3.

The server for navigation can further include a position-cum-evaluation information analyzer 19 that analyzes the number of pieces of evaluation information with position stored in the position-cum-evaluation information storage 9, as shown in FIG. 15. In this case, at the time of use of evaluation information with position, the display controller 11 can display map data to which the evaluation information with position is added while changing the presenting method on the basis of an analysis result acquired by the position-cum-evaluation information analyzer 19, more specifically, by taking into consideration the number of pieces of evaluation information with position, which is the result of the analysis, registered for each identical point or each identical region.

For example, by deepening the color, enlarging the characters, or the like with increase in the number, the display controller presents the evaluation information with position noticeably in such a way that it is easy for the user to notice the evaluation information with position. Further, when different pieces of evaluation information with position are registered for an identical point or an identical region, one of these pieces of evaluation information with position whose number is the largest is presented. As an alternative, the pieces of evaluation information with position can be presented in intermediate representations according to their numbers.

As a result, the navigation system can make points where evaluations have been made concentratedly (points which seem to have a high use value) easily receive attention from the user.

As mentioned above, because the server for navigation in accordance with this Embodiment 3 automatically acquires evaluation information about a point or a region from both a recognition result acquired by regularly performing recognition on the contents of a user's utterance, and the position information acquired by the position sensor, and registers the evaluation information, like those in accordance with Embodiments 1 and 2, the server for navigation can leave an impression (an evaluation) about the point or the region automatically and safely without requiring the user's special operation. Further, by adding the evaluation information to map data and causing display of this map data at the time of use, the server for navigation enables the user to revisit a point through which the user desires to pass once again, bypass a point through which the user desires to never pass again, and so on without requiring the user's work of consciously memorizing the impression about each point and so on, thereby being able to support the user's comfortable movement.

Embodiment 4

Figure 16:
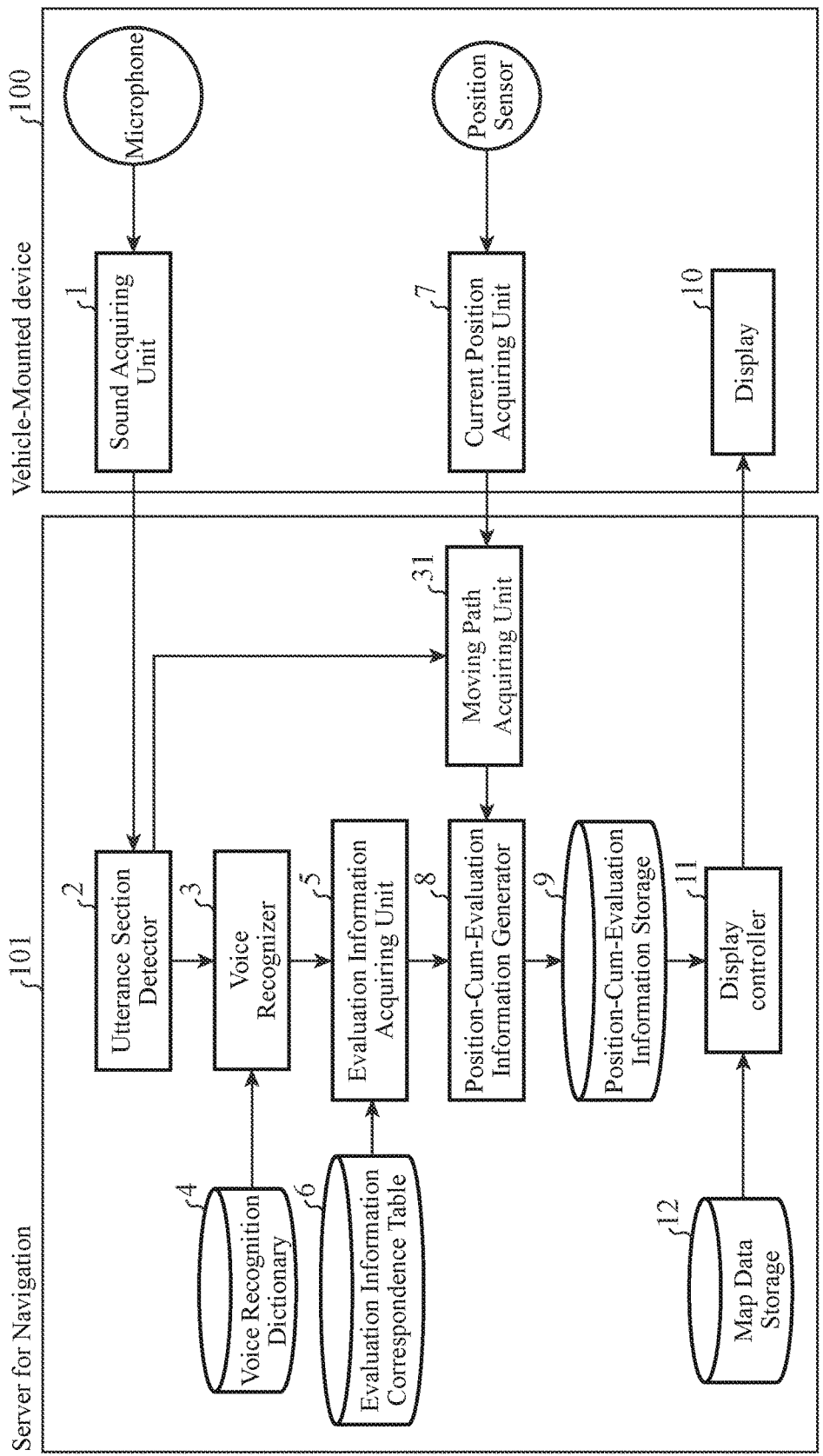
FIG. 16 is a block diagram showing an example of a navigation system in accordance with Embodiment 4.

FIG. 16 is a block diagram showing an example of a navigation system in accordance with Embodiment 4 of the present invention. The same structural components as those explained in Embodiments 1 to 3 are designated by the same reference numerals, and the duplicated explanation of the components will be omitted hereafter. In the navigation system in accordance with Embodiment 4 which will be shown below, a server for navigation 101 further includes a moving path acquiring unit 31, as compared with the navigation system in accordance with Embodiment 3. The navigation system assigns evaluation information with position to the path of an object in a range where the object has moved during a user's utterance.

The moving path acquiring unit 31 acquires a moving path for an utterance section acquired by an utterance section detector 2 on the basis of current position information acquired by a current position acquiring unit 7. More specifically, the moving path acquiring unit acquires the current position acquired by the current position acquiring unit 7 for the utterance section detected by the utterance section detector 2 as a moving path along which a vehicle (a moving object) has moved during a user's utterance.

An position-cum-evaluation information generator 8 combines evaluation information acquired by an evaluation information acquiring unit 5 with the moving path acquired by the moving path acquiring unit 31 to generate evaluation information with position. More specifically, the position-cum-evaluation information generator generates evaluation information with position in such a way that the evaluation information with position is registered as evaluation information about all contiguous points (referred to as a "moving range" from here on) of the path along which the vehicle has moved during the utterance.

Figure 17:
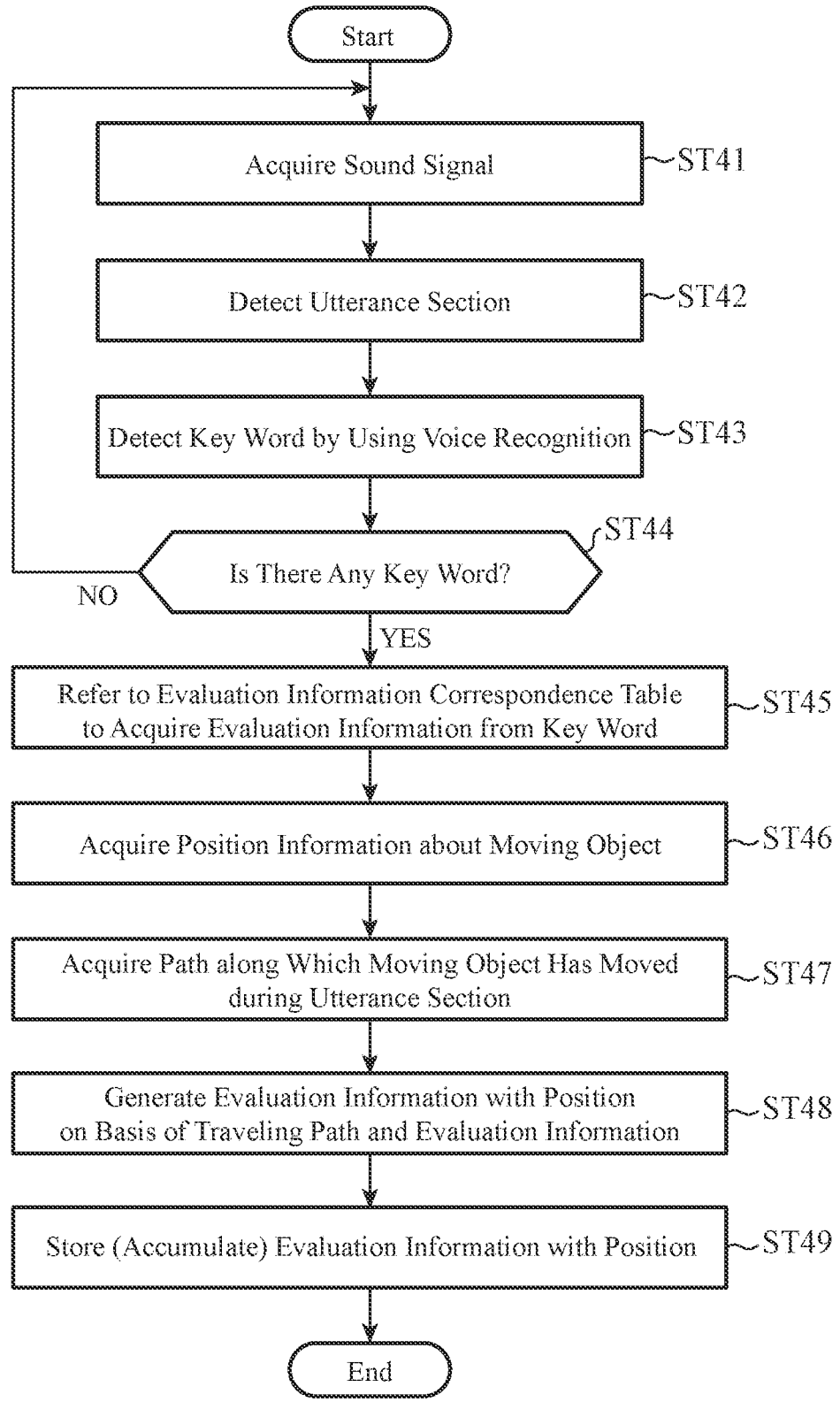
FIG. 17 is a flow chart showing an operation at the time of registration of evaluation information with position which is performed by the navigation system in accordance with Embodiment 4.

Next, the operation of the navigation system in accordance with Embodiment 4 configured as above will explained. FIG. 17 is a flow chart showing the operation at the time of registration of evaluation information with position which is performed by the server for navigation 101 in accordance with Embodiment 4. Because the operation at the time of use is the same as that shown in FIG. 4 in Embodiment 1, an illustration and an explanation of the operation will be omitted hereafter.

The operation at the time of registration will be explained by referring to FIG. 17. Because processes (steps ST41 to ST46) including up to the acquisition of the current position information of the vehicle (the moving object) which is performed by the current position acquiring unit 7 are the same as those of steps ST31 to ST36 of FIG. 13 in Embodiment 3, the explanation of the processes will be omitted hereafter. Then, in this Embodiment 4, the moving path acquiring unit 31 acquires the moving path on the basis of the current position information of the vehicle (the moving object) which is acquired during an utterance section (step ST47). Next, the position-cum-evaluation information generator 8 generates evaluation information with position for the moving range which is acquired during the utterance section by the moving path acquiring unit 31 (step ST48). The navigation system then stores the generated evaluation information with position in a position-cum-evaluation information storage 9 (step ST49). More specifically, together with the evaluation information acquired in step ST45, the moving range on which the evaluation has been made is stored while being linked with the evaluation information.

Figure 18:
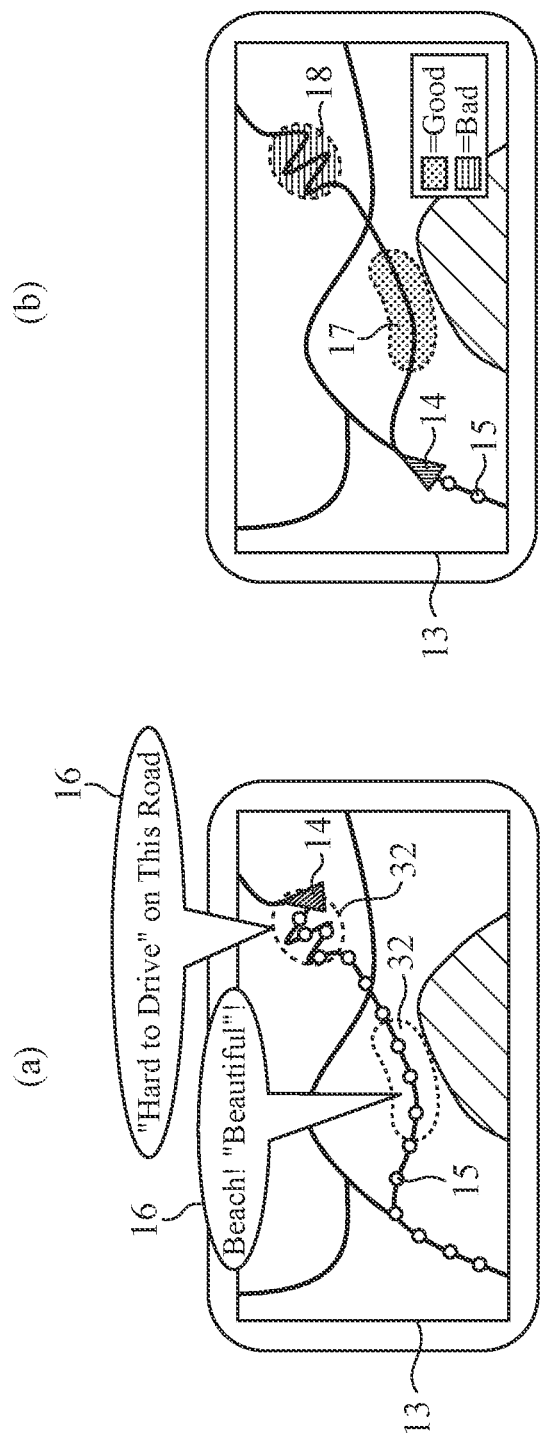
FIG. 18 is an explanatory drawing showing a concrete example of an operation at the time of registration (a) and an operation at the time of use (b) which are performed by the navigation system in accordance with Embodiment 4.

Hereafter, an explanation will be made by providing a concrete example. FIG. 18 is an explanatory drawing showing a concrete example of the operation at the time of registration (a) and the operation at the time of use (b) which are performed by the navigation system in accordance with Embodiment 4. In FIG. 18(*a*), on a map displayed on a display screen 13 of a display (a display unit) 10 of a vehicle-mounted device 100, a plurality of path marks 15 showing the traveling path of the vehicle (the moving object), and balloons 16 each showing the contents of a user's utterance are illustrated in a state in which a vehicle mark 14 showing the position of the vehicle (the moving object) is displayed, like in the case of FIG. 5(*a*) in Embodiment 1. Although the example in which evaluation information associated with the contents of a user's utterance is registered with the evaluation information being linked with the point where the utterance was made is shown in Embodiment 1, in this Embodiment 4, evaluation information associated with the contents of a user's utterance is registered with the evaluation information being linked with a moving path 32 acquired during the utterance section of the utterance (a traveling path which consists of a plurality of path marks 15).

As a result, at the time of use, for example, in a case in which the user passes through the same location again several days later, when a map (FIG. 18(*b*)) including a moving path about which already registered evaluation information with position has been registered is displayed on the screen, for example, regions (17, 18) each of which corresponds to the moving path 32 about which the evaluation information with position has been registered and has a fixed area, and to each of which a color or the like according to the type of the evaluation information is applied is superimposed and displayed on the map.

As a result, because the evaluation information with position is displayed while an error in the duration of the user's utterance and an error in the timing of the utterance of a key word which is a target for evaluation, and an error between the position of the point which is the target point for evaluation and that of the point on which an evaluation (recognition) was actually made are absorbed, the reliability of the evaluation information can be improved and information more useful for the user can be presented to the user.

A weight for each point can be varied according to the size of the moving range. For example, when the vehicle travels a region having an area of ten points during an utterance, evaluation information with position for each of the ten points is registered as one-tenth of evaluation information with position. Because evaluation information with position corresponding to one evaluation can be registered for one utterance even in a case in which the utterance is long and even in a case in which the vehicle is travelling at a high speed, fairness can be maintained between pieces of evaluation information with position independently upon the utterance duration and the travelled distance during the utterance, and the usability can be improved.

As mentioned above, because the server for navigation in accordance with this Embodiment 4 automatically acquires evaluation information about a moving path which is pieces of position information acquired, as a moving path during a user's utterance, by a position sensor from both a recognition result acquired by regularly performing recognition on the user's utterance, and the moving path, and registers the evaluation information, the server for navigation can leave an impression (evaluation) about the above-mentioned moving path (an area having a range) without requiring the user's special operation. As a result, a positional error other than an impression (evaluation) about a pinpointed point can also be absorbed. Further, at the time of use, the server for navigation enables the user to revisit a region through which the user desires to pass once again, bypass a region through which the user desires to never pass again, and so on without requiring the user's work of consciously memorizing the impression about each moving path and so on, thereby being able to support the user's comfortable movement.

Embodiment 5

Figure 19:
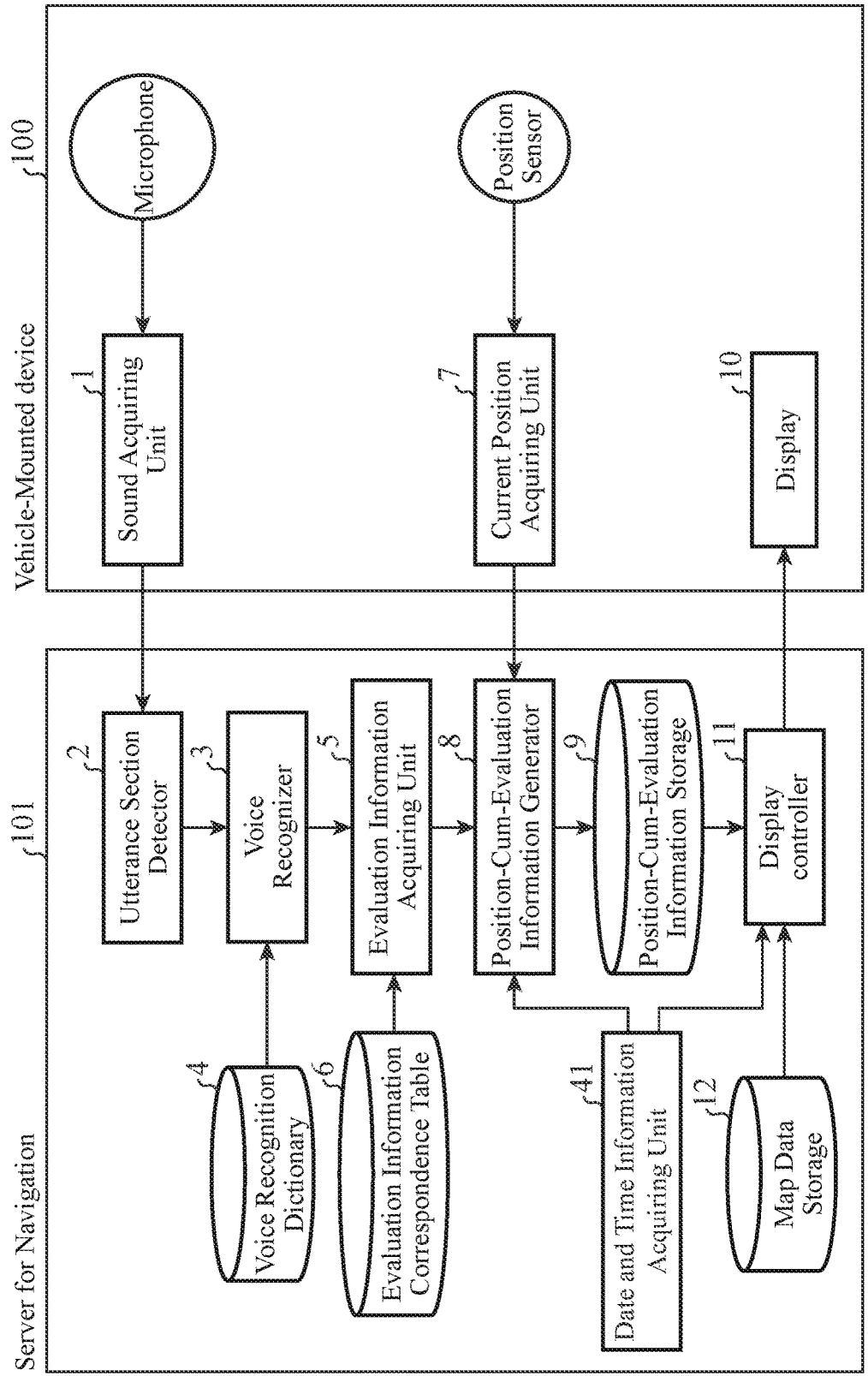
FIG. 19 is a block diagram showing an example of a navigation system in accordance with Embodiment 5.

FIG. 19 is a block diagram showing an example of a navigation system in accordance with Embodiment 5 of the present invention. The same structural components as those explained in Embodiments 1 to 4 are designated by the same reference numerals, and the duplicated explanation of the components will be omitted hereafter. In the navigation system in accordance with Embodiment 5 which will be shown below, a server for navigation 101 further includes a date and time information acquiring unit 41, as compared with the navigation system in accordance with Embodiment 3. The navigation system then adds date and time information to evaluation information with position and stores this evaluation information with position, and presents evaluation information with position suitable for the date and time of use to a user.

The date and time information acquiring unit 41 acquires current date and time information (information including a time, a date, a month, a year, etc.) from a clock or the like in the server for navigation 101.

A position-cum-evaluation information generator 8 then adds the current date and time information acquired by the date and time information acquiring unit 41 to generate evaluation information with position.

Further, a display controller 11 displays map data to which only evaluation information with position in which the current date and time acquired by the date and time information acquiring unit 41 matches the date and time information added to the evaluation information with position is added on a display.

Figure 20:
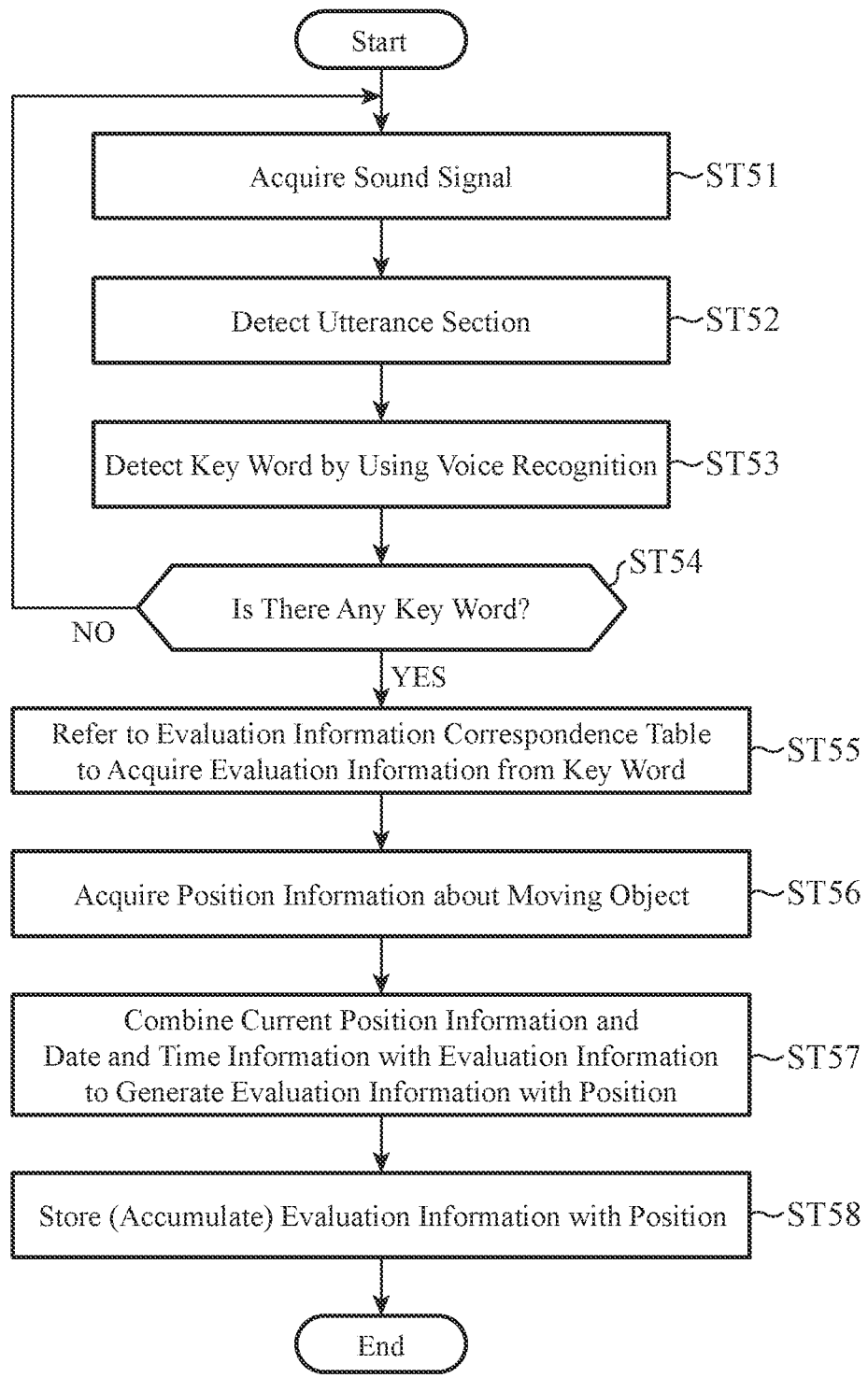
FIG. 20 is a flow chart showing an operation at the time of registration of evaluation information with position which is performed by the navigation system in accordance with Embodiment 5.
Figure 21:
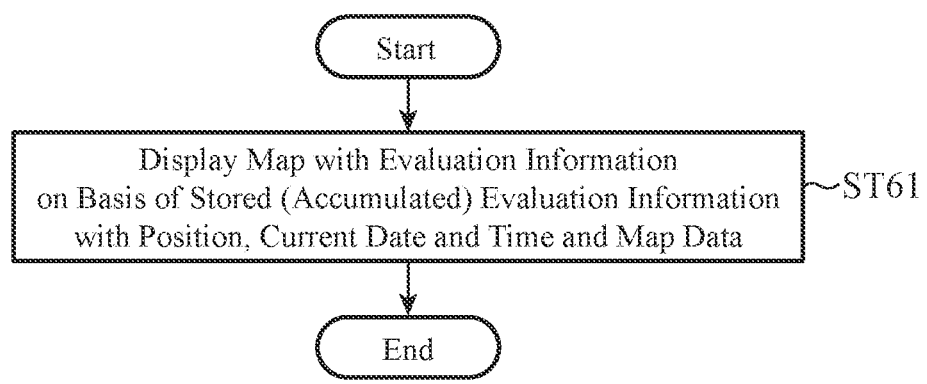
FIG. 21 is a flow chart showing an operation at the time of use of evaluation information with position which is performed by the navigation system in accordance with Embodiment 5.

Next, the operation of the navigation system in accordance with Embodiment 5 configured as above will explained. FIG. 20 is a flow chart showing the operation at the time of registration of evaluation information with position which is performed by the server for navigation 101 in accordance with Embodiment 5. Further, FIG. 21 is a flow chart showing the operation at the time of use of evaluation information with position which is performed by the server for navigation 101 in accordance with Embodiment 5.

First, the operation at the time of registration will be explained by referring to FIG. 20. Because processes (steps ST51 to ST56) including up to acquisition of current position information of a vehicle (a moving object) which is performed by a current position acquiring unit 7 are the same as those of steps ST31 to ST36 of FIG. 13 in Embodiment 3, the explanation of the processes will be omitted hereafter. Then, in this Embodiment 5, the date and time information acquiring unit 41 acquires current date information, and, when generating evaluation information with position on the basis of the current position information and evaluation information, the position-cum-evaluation information generator 8 adds the current date information to generate evaluation information with position (step ST57). The navigation system then stores the generated evaluation information with position in a position-cum-evaluation information storage 9 (step ST58).

Next, the operation at the time of use will be explained by referring to FIG. 21. The display controller 11 displays a map to which only evaluation information with position matching at least one of the current time, a time zone, the date, the month, the year, and a time period is added on a screen, such as a display, on the basis of the evaluation information with position which is stored in the position-cum-evaluation information storage 9 and to which the date and time information is added, and map data stored in a map data storage 12 (step ST61).

As mentioned above, the server for navigation in accordance with this Embodiment 5 can provide only appropriate information about evaluation information depending on a season, a time zone or the like, such as evaluation information about a location where the night view is beautiful or a location where the road is frozen in the mornings and evenings in winter, at an appropriate timing.

Embodiment 6

Figure 22:
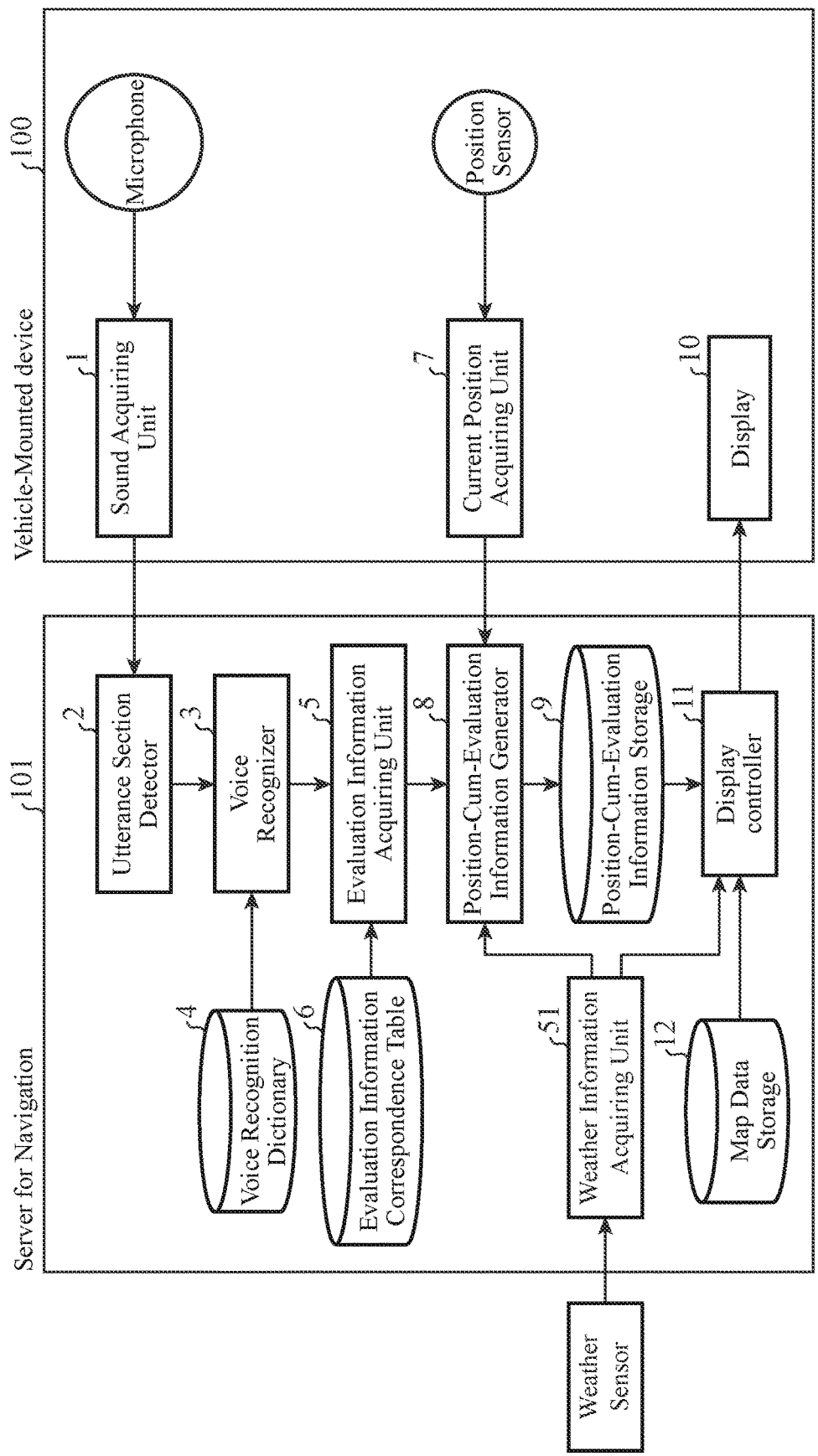
FIG. 22 is a block diagram showing an example of a navigation system in accordance with Embodiment 6.

FIG. 22 is a block diagram showing an example of a navigation system in accordance with Embodiment 6 of the present invention. The same structural components as those explained in Embodiments 1 to 5 are designated by the same reference numerals, and the duplicated explanation of the components will be omitted hereafter. In the navigation system in accordance with Embodiment 6 which will be shown below, a server for navigation 101 further includes a weather information acquiring unit 51, as compared with the navigation system in accordance with Embodiment 3. The navigation system adds weather information to evaluation information with position and stores this evaluation information with position, and presents evaluation information with position suitable for the weather at the time of use to a user.

The weather information acquiring unit 51 acquires at least one of the weather, the illumination, the temperature, and the humidity as current weather information by using a weather sensor. As the weather sensor, a rain sensor, an illuminance sensor, a thermometer, a hygrometer, or the like which is mounted in a typical vehicle can be used.

A position-cum-evaluation information generator 8 then adds the current weather information acquired by the weather information acquiring unit 51 to generate evaluation information with position.

Further, a display controller 11 displays map data to which only evaluation information with position in which the current weather acquired by the weather information acquiring unit 51 matches the weather information added to the evaluation information with position is added on a display.

Figure 23:
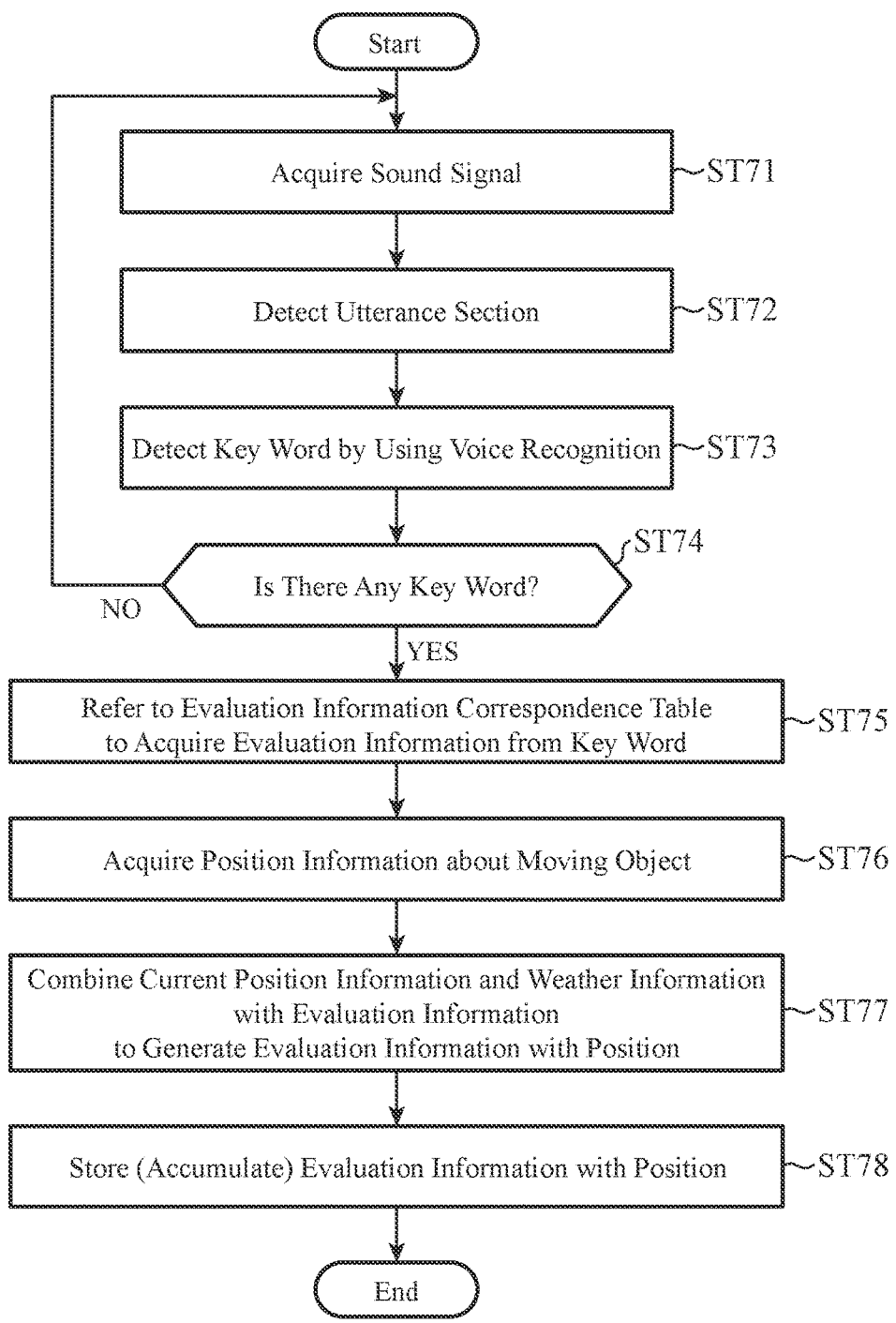
FIG. 23 is a flow chart showing an operation at the time of registration of evaluation information with position which is performed by the navigation system in accordance with Embodiment 6.
Figure 24:
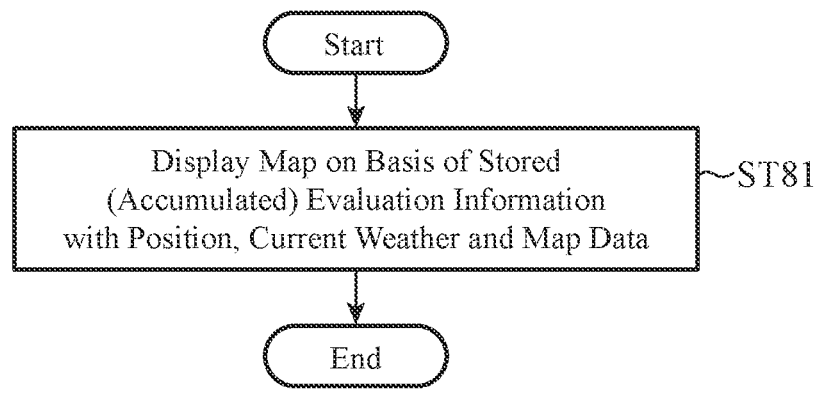
FIG. 24 is a flow chart showing an operation at the time of use of evaluation information with position which is performed by the navigation system in accordance with Embodiment 6.

Next, the operation of the navigation system in accordance with Embodiment 6 configured as above will explained. FIG. 23 is a flow chart showing the operation at the time of registration of evaluation information with position which is performed by the server for navigation 101 in accordance with Embodiment 6. Further, FIG. 24 is a flow chart showing the operation at the time of use of evaluation information with position which is performed by the server for navigation 101 in accordance with Embodiment 6.

First, the operation at the time of registration will be explained by referring to FIG. 23. Because processes (steps ST71 to ST76) including up to acquisition of current position information of a vehicle (a moving object) which is performed by a current position acquiring unit 7 are the same as those of steps ST31 to ST36 of FIG. 13 in Embodiment 3, the explanation of the processes will be omitted hereafter. Then, in this Embodiment 6, when the weather information acquiring unit 51 acquires the current weather information and, when generating evaluation information with position on the basis of the current position information and evaluation information, the position-cum-evaluation information generator 8 adds the current weather information to generate evaluation information with position (step ST77). The navigation system then stores the generated evaluation information with position in a position-cum-evaluation information storage 9 (step ST78).

Next, the operation at the time of use will be explained by referring to FIG. 24. The display controller 11 displays a map to which only evaluation information with position matching at least one of the current weather, the illumination, the temperature, and the humidity is added on a screen, such as a display, on the basis of both the evaluation information with position which is stored in the position-cum-evaluation information storage 9 and to which the weather information is added and map data stored in a map data storage 12 (step ST81).

As mentioned above, the server for navigation in accordance with this Embodiment 6 can provide only appropriate information about evaluation information depending on a weather condition, such as weather or air temperature, at an appropriate timing.

Embodiment 7

Figure 25:
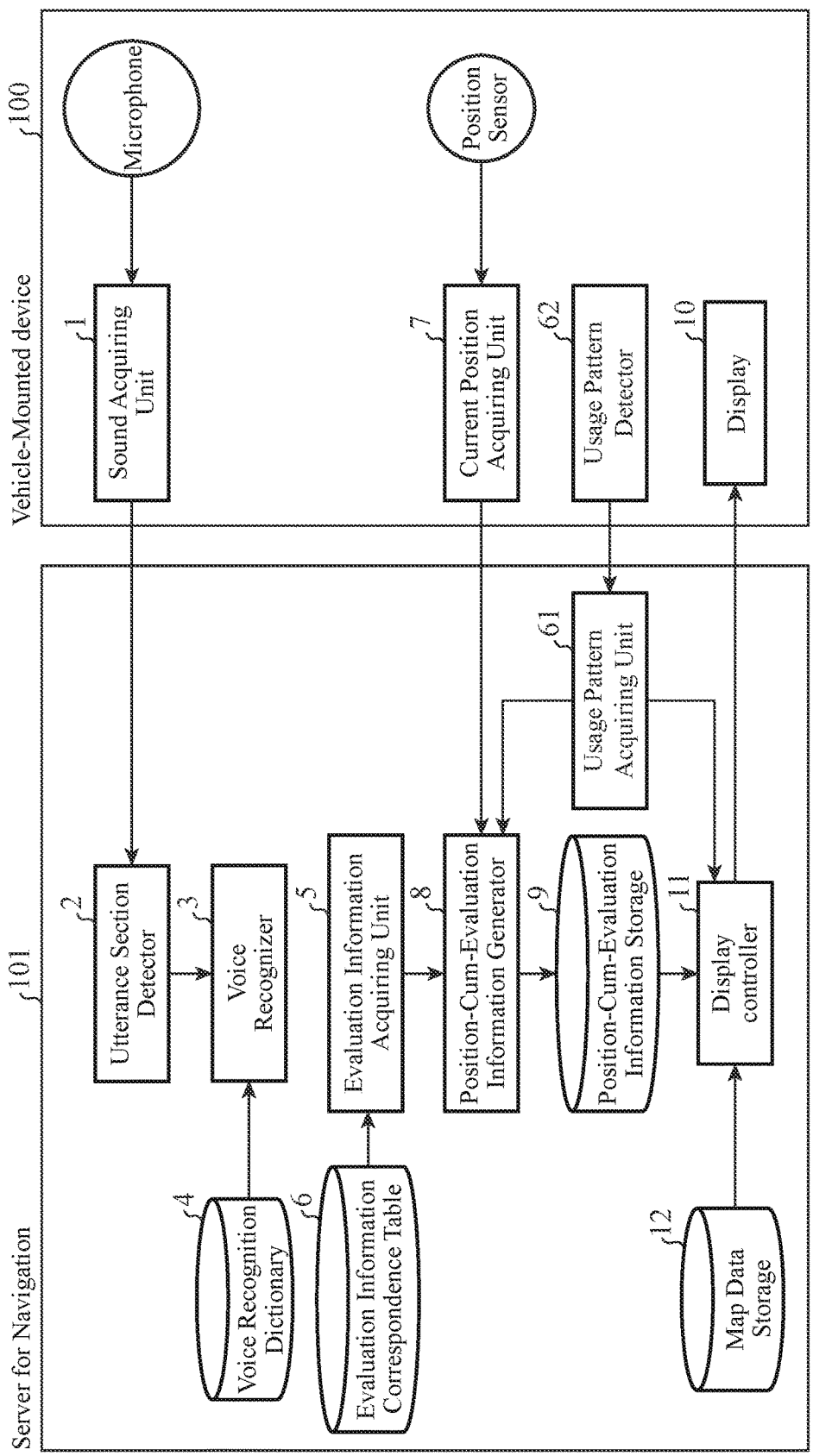
FIG. 25 is a block diagram showing an example of a navigation system in accordance with Embodiment 7.

FIG. 25 is a block diagram showing an example of a navigation system in accordance with Embodiment 7 of the present invention. The same structural components as those explained in Embodiments 1 to 6 are designated by the same reference numerals, and the duplicated explanation of the components will be omitted hereafter. In the navigation system in accordance with Embodiment 7 which will be shown below, a server for navigation 101 further includes a usage pattern acquiring unit 61, as compared with the navigation system in accordance with Embodiment 3. The navigation system then adds usage pattern information to evaluation information with position and stores this evaluation information with position, and presents evaluation information with position suitable for a usage pattern to a user.

A usage pattern detector 62 detects a usage pattern of itself (a moving object). For example, the usage pattern detector detects whether or not the current usage pattern of the moving object is vehicle (car) according to whether or not a vehicle speed signal is inputted.

The usage pattern acquiring unit 61 then determines whether or not the current usage pattern of the moving object is vehicle (car) from the presence or absence of the vehicle speed signal, or the like which is received from the usage pattern detector 62, to acquire the usage pattern.

Because an explanation is made in this Embodiment 7 by assuming that the moving object is a vehicle, the type of the usage pattern is "car." However, in a case in which the moving object is a person and is walking around with a mobile information terminal provided with a sound acquiring unit 1, a current position acquiring unit 7, and a display 10, the type of the usage pattern is "walk." In this embodiment, an explanation will be made by assuming that the following two types: "car" and "walk" exist as the type of the usage pattern. When the usage pattern is "car", the usage pattern shows that a vehicle-mounted device 100 is placed in a state in which the vehicle-mounted device is used while it is mounted in (or carried onto) a car. When the usage pattern is "walk", the usage pattern shows that a device is placed in a state in which a person walking uses the device while carrying it in hand. In this case, for example, there can be considered an example in which when a vehicle speed signal is inputted, the type of the usage pattern is set to "car" while when no vehicle speed signal is inputted, the type of the usage pattern is set to "walk." As an alternative, the usage pattern can be determined by allowing the user to set the usage pattern by performing a key operation, a touch panel operation, or the like at the time of starting to use the navigation system.

Although the example in which the following two types: "car" and "walk" are provided as the types of the usage pattern is explained in this Embodiment 7, "two-wheeled vehicle", "electric car", "airplane", etc. can be provided additionally as usage pattern types, and any usage pattern type can be added as long as it indicates a pattern at the time of use (at the time of movement).

A position-cum-evaluation information generator 8 then adds the usage pattern of the moving object acquired by the usage pattern acquiring unit 61 to generate evaluation information with position.

Further, a display controller 11 displays map data to which only evaluation information with position in which the usage pattern of the moving object acquired by the usage pattern acquiring unit 61 matches the usage pattern added to the evaluation information with position is added on a display.

Figure 26:
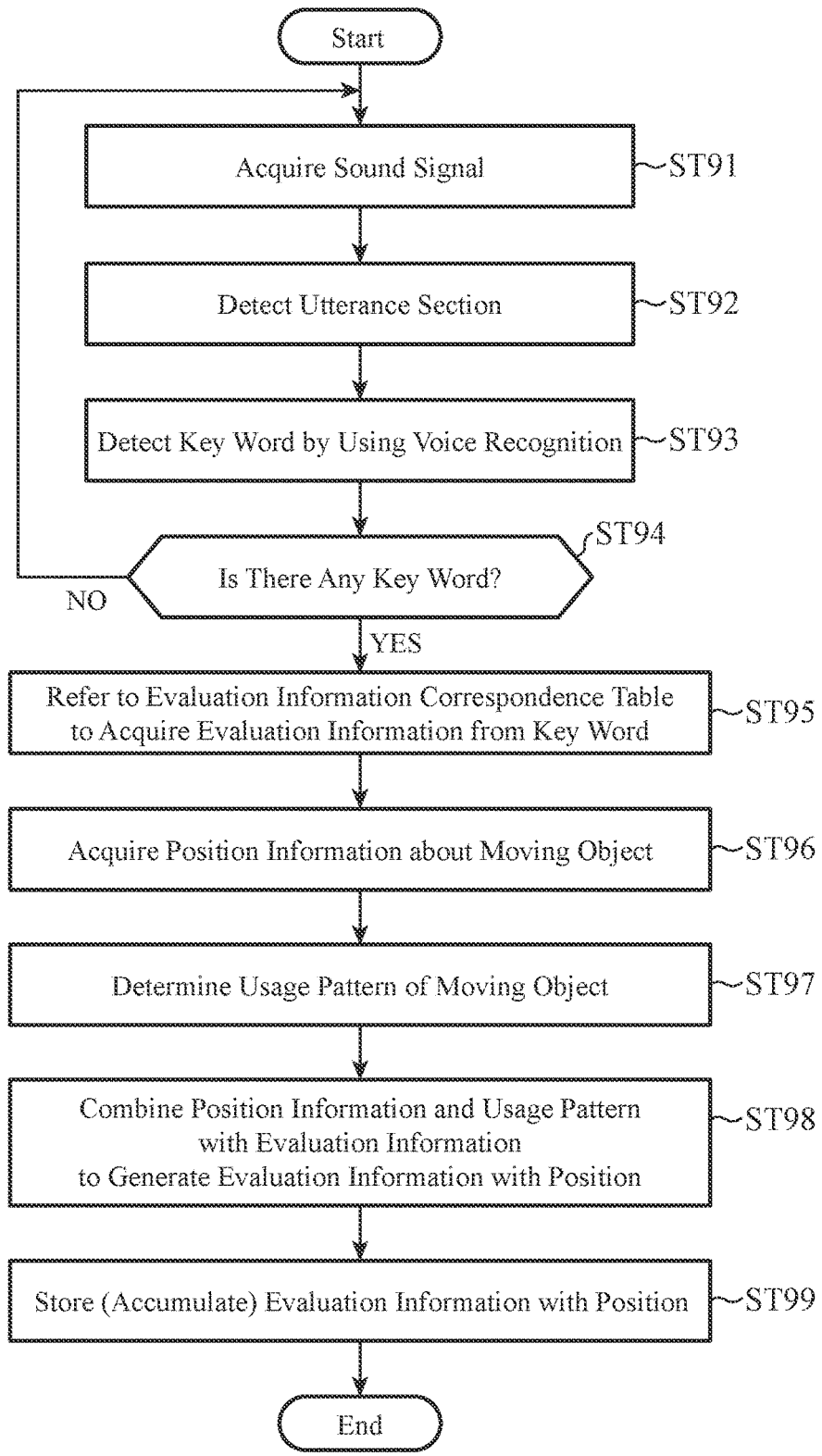
FIG. 26 is a flow chart showing an operation at the time of registration of evaluation information with position which is performed by the navigation system in accordance with Embodiment 7.
Figure 27:
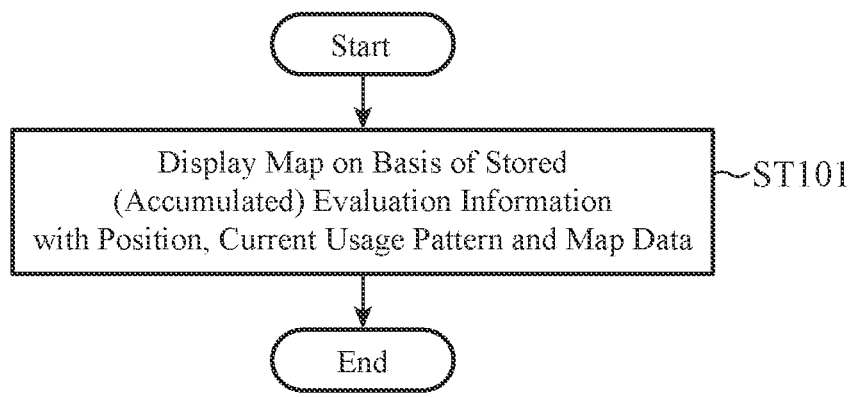
FIG. 27 is a flow chart showing an operation at the time of use of evaluation information with position which is performed by the navigation system in accordance with Embodiment 7.

Next, the operation of the navigation system in accordance with Embodiment 7 configured as above will explained. FIG. 26 is a flow chart showing the operation at the time of registration of evaluation information with position which is performed by the server for navigation 101 in accordance with Embodiment 7. Further, FIG. 27 is a flow chart showing the operation at the time of use of evaluation information with position which is performed by the server for navigation 101 in accordance with Embodiment 7.

First, the operation at the time of registration will be explained by referring to FIG. 26. Because processes (steps ST91 to ST96) including up to acquisition of current position information of itself (the moving object) which is performed by a current position acquiring unit 7 are the same as those of steps ST31 to ST36 of FIG. 13 in Embodiment 3, the explanation of the processes will be omitted hereafter. In this Embodiment 7, the usage pattern detector 62 then detects the presence or absence of a vehicle speed signal input, or the like, and the usage pattern acquiring unit 61 determines the current usage pattern of the moving object from the presence or absence of a vehicle speed signal input, or the like which is received from the usage pattern detector 62, to acquire the usage pattern (step ST97). Next, when generating evaluation information with position on the basis of the current position information and evaluation information, the position-cum-evaluation information generator 8 adds the type of the current usage pattern to generate evaluation information with position (step ST98). The navigation system then stores the generated evaluation information with position in a position-cum-evaluation information storage 9 (step ST99).

Next, the operation at the time of use will be explained by referring to FIG. 27. The display controller 11 displays a map with evaluation information which is limited to only evaluation information with position matching the current usage pattern on a screen, such as a display, on the basis of both evaluation information with position which is stored in the position-cum-evaluation information storage 9 and to which a usage pattern type is added and map data stored in a map data storage 12 (step ST101).

As mentioned above, the server for navigation in accordance with this Embodiment 7 can provide information depending on a usage pattern, such as information showing that, for example, there is no problem with the user's travelling by walk, but, when travelling by car, the road width is narrow and hence it is hard to drive, for the user while discriminating the information depending on the usage pattern from other information.

Embodiment 8

Figure 28:
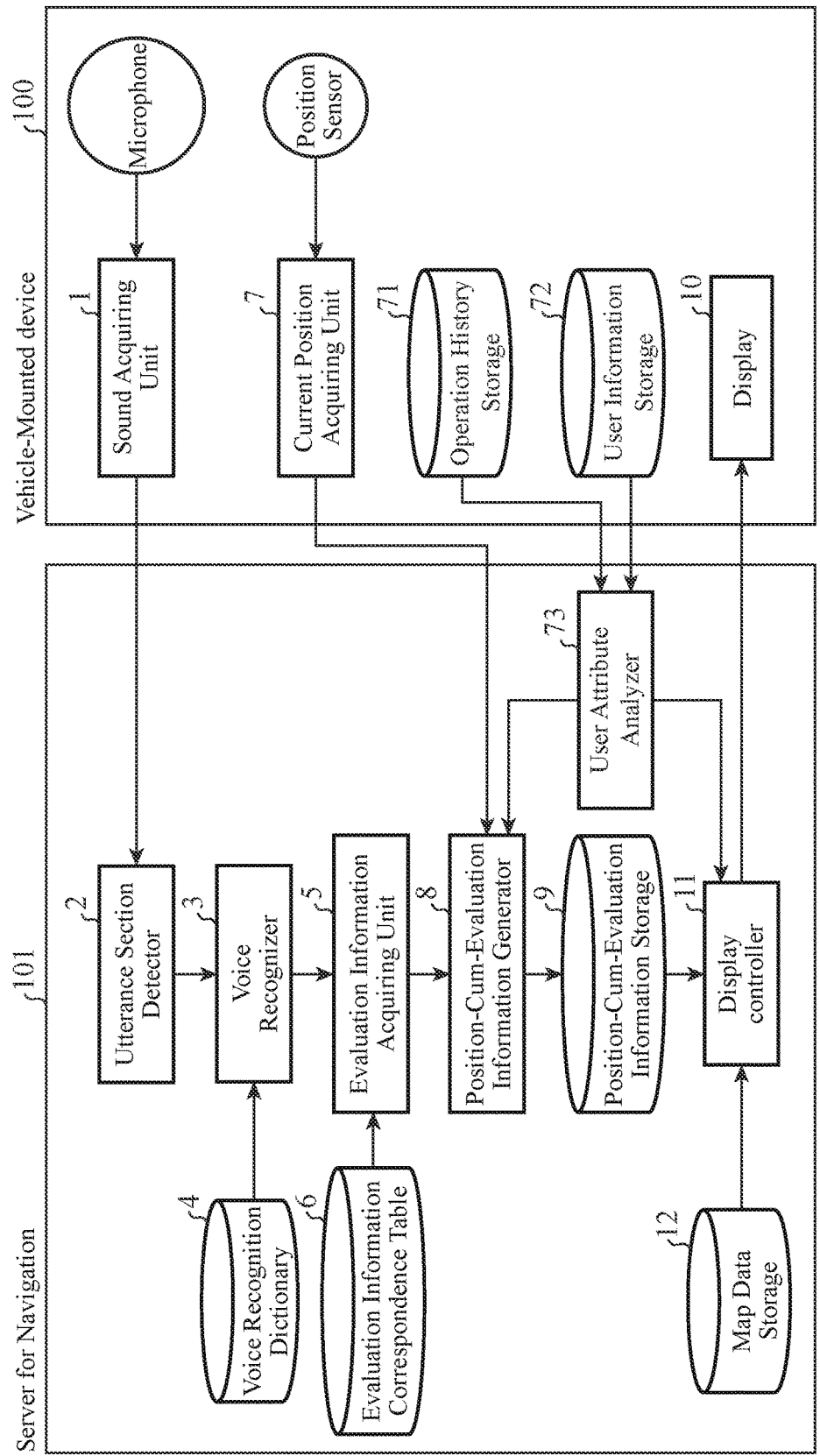
FIG. 28 is a block diagram showing an example of a navigation system in accordance with Embodiment 8.

FIG. 28 is a block diagram showing an example of a navigation system in accordance with Embodiment 8 of the present invention. The same structural components as those explained in Embodiments 1 to 7 are designated by the same reference numerals, and the duplicated explanation of the components will be omitted hereafter. In the navigation system in accordance with Embodiment 8 which will be shown below, a vehicle-mounted device 100 further includes an operation history storage 71 and a user information storage 72, and a server for navigation 101 further includes a user attribute analyzer 73, as compared with the navigation system in accordance with Embodiment 3.

The operation history storage 71 stores an operation history, such as a history of key inputs made by a user from a key input unit. For example, the operation history storage stores operation histories, such as a history of destination settings made by a user and a history of operations on information regarding a frequently-used function, and so on.

The user information storage 72 stores user information preset by a user. For example, the user information storage stores a user's gender, age, interest, etc. In this embodiment, it is assumed that the user information storage stores user information including at least a user's gender and age.

The user attribute analyzer 73 analyzes a user attribute on the basis of both the user operation histories stored in the operation history storage 71 and the user information stored in the user information storage 72. For example, a user attribute like "eating out lover" can be added to a user who eats out frequently on the basis of the destination setting history, and plural pieces of information can be combined and handled as vector data by, for example, counting the number of times of the destination setting according to genre.

A position-cum-evaluation information generator 8 then adds the user attribute analyzed by the user attribute analyzer 73 to generate evaluation information with position.

Further, a display controller 11 presents evaluation information with position suitable for the user to the user while limiting the evaluation information with position to evaluation information with position whose user attribute added thereto matches the user attribute analyzed by the user attribute analyzer 73.

Figure 29:
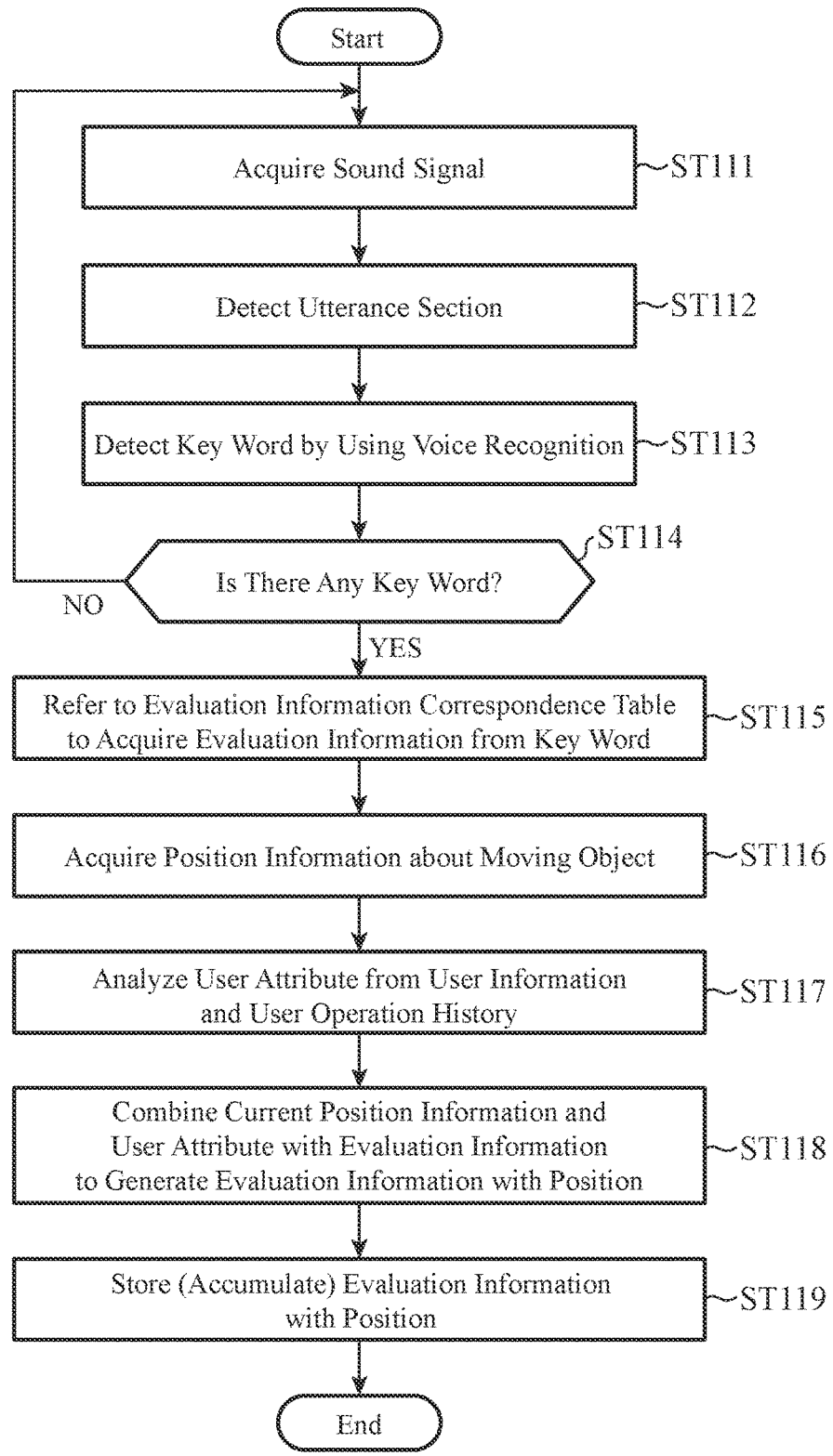
FIG. 29 is a flow chart showing an operation at the time of registration of evaluation information with position which is performed by the navigation system in accordance with Embodiment 8.
Figure 30:
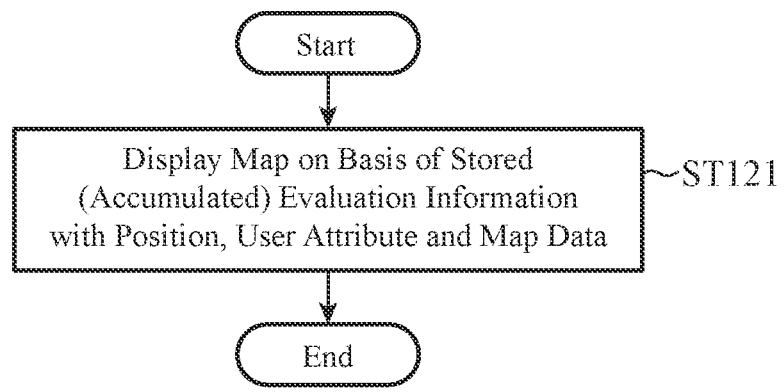
FIG. 30 is a flow chart showing an operation at the time of use of evaluation information with position which is performed by the navigation system in accordance with Embodiment 8.

Next, the operation of the navigation system in accordance with Embodiment 8 configured as above will explained. FIG. 29 is a flow chart showing the operation at the time of registration of evaluation information with position which is performed by the server for navigation 101 in accordance with Embodiment 8. Further, FIG. 30 is a flow chart showing the operation at the time of use of evaluation information with position which is performed by the server for navigation 101 in accordance with Embodiment 8.

First, the operation at the time of registration will be explained by referring to FIG. 29. Because processes (steps ST111 to ST116) including up to acquisition of current position information of a vehicle (a moving object) which is performed by a current position acquiring unit 7 are the same as those of steps ST31 to ST36 of FIG. 13 in Embodiment 3, the explanation of the processes will be omitted hereafter. Then, in this Embodiment 9, the user attribute analyzer 73 analyzes a user attribute on the basis of the user information stored in the user information storage 72 and the operation histories stored in the operation history storage 71 (step ST117).

Next, the position-cum-evaluation information generator adds the user attribute analyzed by the user attribute analyzer 73 to generate evaluation information with position (step ST118). Then, the evaluation information with position to which the user attribute generated by the position-cum-evaluation information generator 8 is added is stored (accumulated) in a position-cum-evaluation information storage 9 (step ST119).

Next, the operation at the time of use will be explained by referring to FIG. 30. On the basis of the evaluation information with position to which a user attribute is added, the evaluation information with position being stored in the position-cum-evaluation information storage 9, the user's user attribute analyzed by the user attribute analyzer 73, and map data stored in a map data storage 12, the display controller 11 displays a map with evaluation information which is limited only to evaluation information with position whose user attribute matches or is similar to the user's user attribute, i.e., a map with evaluation information corresponding to the user attribute on a screen, such as a display (step ST121).

As mentioned above, the server for navigation in accordance with this Embodiment 8 can provide information which meets each user's taste and attribute. As a result, a problem of displaying information also including unnecessary information and hence making the information difficult to understand can be prevented, and only information which is likely to be more helpful for the user can be displayed selectively.

Embodiment 9

Figure 31:
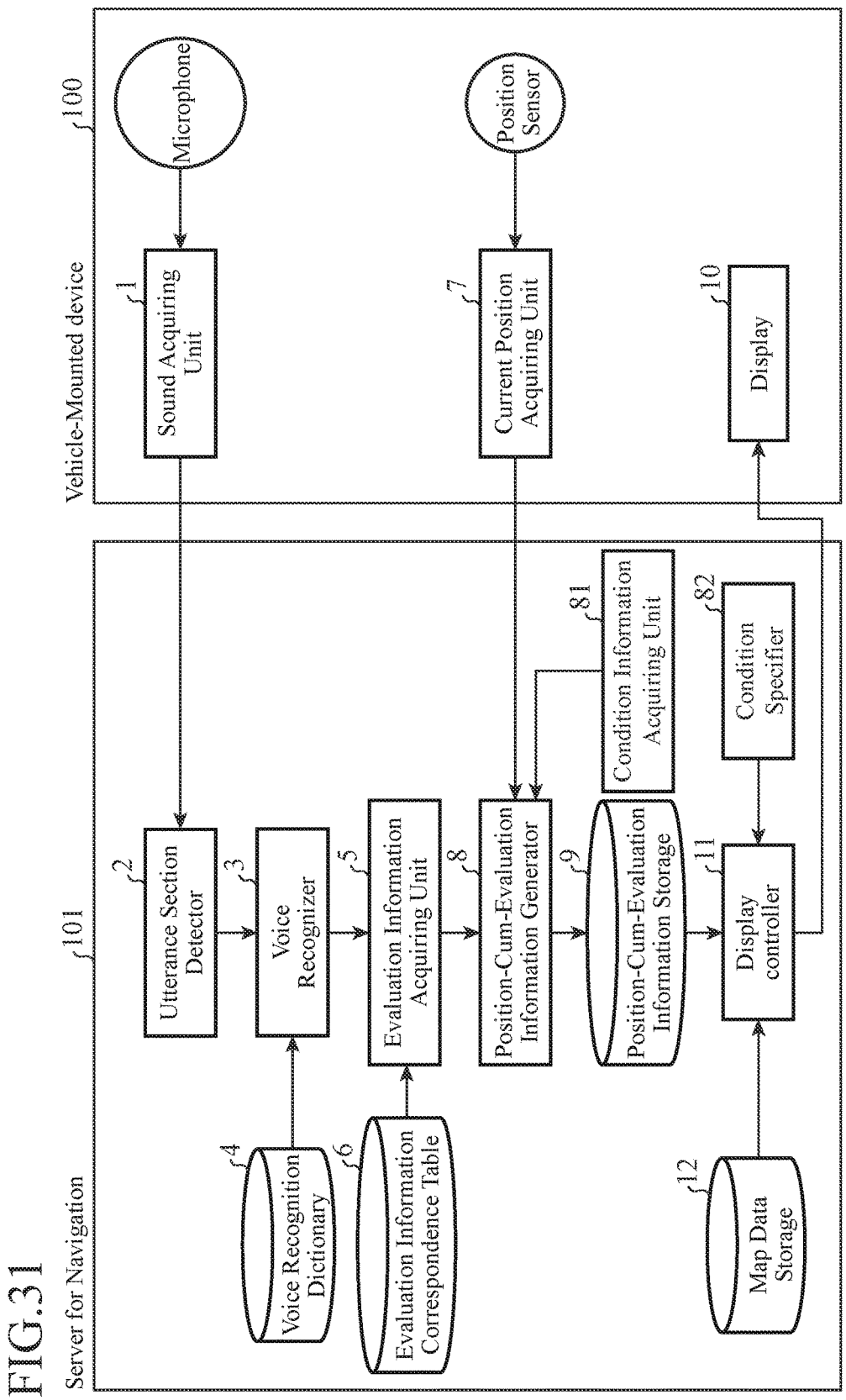
FIG. 31 is a block diagram showing an example of a navigation system in accordance with Embodiment 9.

FIG. 31 is a block diagram showing an example of a navigation system in accordance with Embodiment 9 of the present invention. The same structural components as those explained in Embodiments 1 to 8 are designated by the same reference numerals, and the duplicated explanation of the components will be omitted hereafter. In the navigation system in accordance with Embodiment 9, which will be shown below, a server for navigation 101 includes a condition information acquiring unit 81 that acquires or determines various pieces of information, the condition information acquiring unit corresponding to a date and time information acquiring unit 41, a weather information acquiring unit 51, a usage pattern acquiring unit 61, a user attribute analyzer 73, or the like, like either one of the navigation systems in accordance with Embodiments 5 to 8, and further includes a condition specifier 82.

The condition information acquiring unit 81 includes at least one of a date and time information acquiring unit 41, a weather information acquiring unit 51, a usage pattern acquiring unit 61, and a user attribute analyzers 73, which are the same as those explained in Embodiments 5 to 8. More specifically, the condition information acquiring unit 81 acquires at least one of current date and time information, weather information, a usage pattern of a moving object, and a user attribute.

The condition specifier 82 enables a user to specify a type of evaluation information, a recognition key word, a time, a time zone, a date, a month, a year, a period, a weather, a usage pattern type, a user attribute, the number of pieces of evaluation information, or the like by performing an operation from a key input unit or the like at the time of use of evaluation information with position. In this embodiment, an explanation will be made by assuming that at least one of the following conditions: the current date and time information, the weather information, the usage pattern of the moving object, a user attribute, and a type of evaluation information ("good" or "bad") is specified.

A position-cum-evaluation information generator 8 adds the condition acquired by the condition information acquiring unit 81 (at least one of the date and time information, the weather information, the usage pattern, and the user attribute) to generate evaluation information with position.

Further, a display controller 11 displays a map on a display screen, such as a display, by limiting evaluation information with position to evaluation information with position matching the condition specified by the condition specifier 82. More specifically, the display controller displays map data to which only evaluation information with position in which the condition specified by the condition specifier 82 matches the condition added to the abovementioned evaluation information with position is added on the display screen such as the display.

Figure 32:
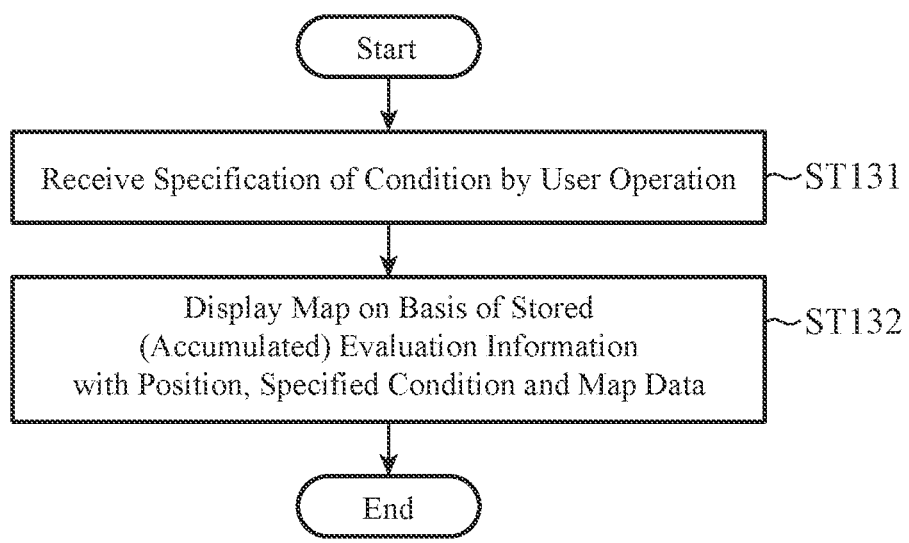
FIG. 32 is a flow chart showing an operation at the time of use of evaluation information with position which is performed by the navigation system in accordance with Embodiment 9.

Next, the operation of the navigation system in accordance with Embodiment 9 configured as above will explained. FIG. 32 is a flow chart showing the operation at the time of use of evaluation information with position which is performed by the server for navigation 101 in accordance with Embodiment 9. Because the operation at the time of registration is the same as that explained in Embodiments 5 to 8, the explanation of the operation will be omitted.

The operation at the time of use will be explained by referring to FIG. 32. First, the condition specifier 82 accepts specification of a condition from a user's input operation (step ST131). The user is enabled to input a condition freely and arbitrarily. For example, the user can input a date or a time zone when he or she is scheduled to go out, input "rain" when he or she desires to search for a location about which evaluation information of "good" was provided even when it is raining, or input "car" as the usage pattern when he or she desires the navigation system to present only an evaluation result about the usage pattern of "car."

The display controller 11 then displays a map with evaluation information which is limited only to evaluation information with position matching the specified condition inputted in step ST131 on the screen, such as the display, on the basis of both evaluation information with position which is stored in a position-cum-evaluation information storage 9 and to which condition information is added, and map data stored in a map data storage 12 (step ST132).

As mentioned above, the server for navigation in accordance with this Embodiment 9 can check to see, in advance, only evaluation information with position stored with a condition being added to the evaluation information with position according to the condition, such as a specific date and time or weather, by specifying a date and time when the user is scheduled to pass through the neighborhood of a point, weather, or the like as one of various conditions. Further, according to a condition, such as specification of users having similar interests or users having a specific attribute, the navigation system can acquire only evaluation information with position stored with such a condition as above being added from the registered pieces of user information and so on. Further, when searching for only pieces of evaluation information of "good", the user is also enabled to cause the navigation system to display only pieces of good evaluation information by specifying evaluation information of "good" as a specified condition.

Embodiment 10

Figure 33:
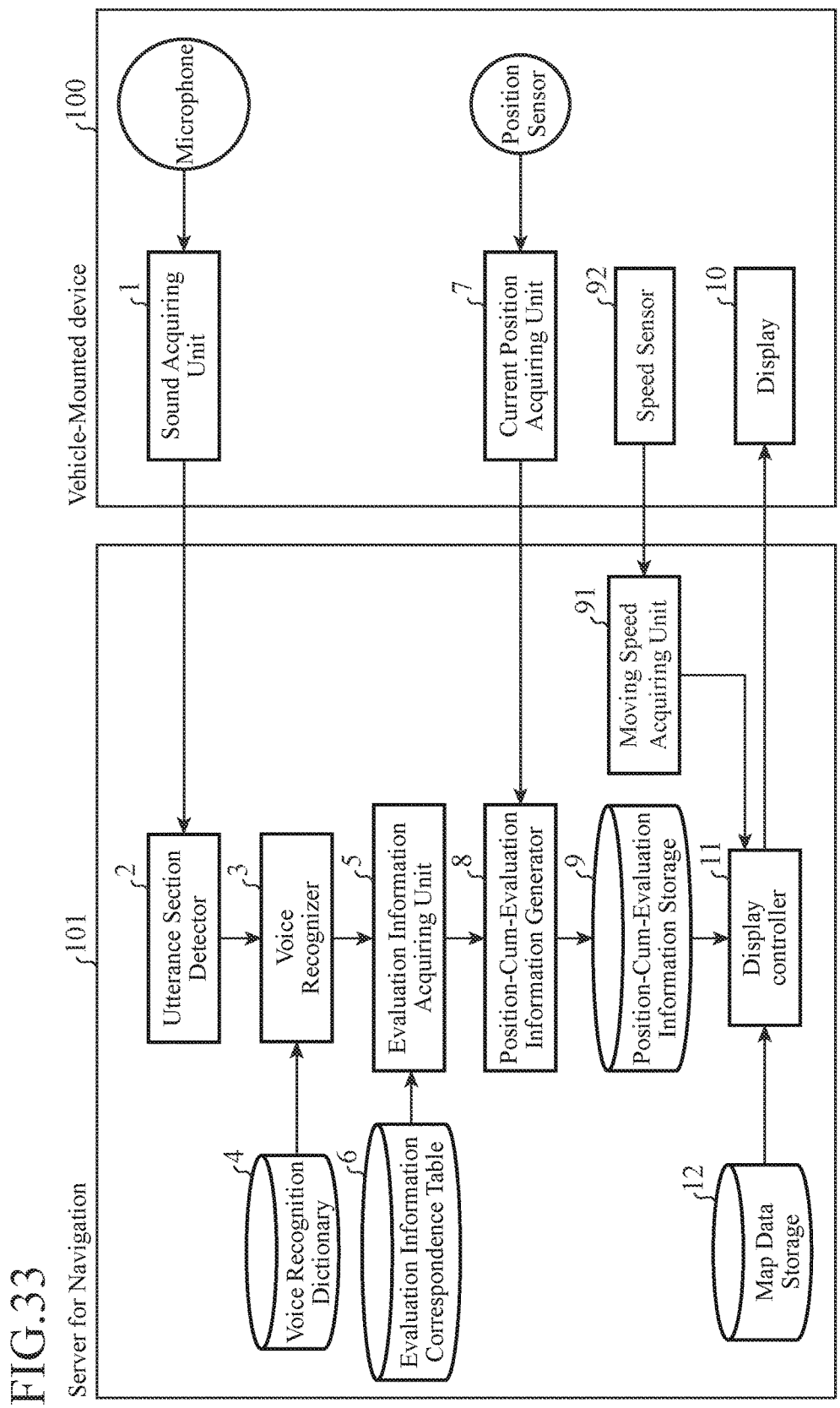
FIG. 33 is a block diagram showing an example of a navigation system in accordance with Embodiment 10.

FIG. 33 is a block diagram showing an example of a navigation system in accordance with Embodiment 10 of the present invention. The same structural components as those explained in Embodiments 1 to 9 are designated by the same reference numerals, and the duplicated explanation of the components will be omitted hereafter. In the navigation system in accordance with Embodiment 10 which will be shown below, a server for navigation 101 further includes a moving speed acquiring unit 91, as compared with the navigation system in accordance with Embodiment 3.

On the basis of a speed sensor 92 of a vehicle (a moving object), the moving speed acquiring unit 91 acquires the speed of the moving object. As the speed sensor 92, the speed sensor of the vehicle can be used. As an alternative, the speed can be calculated and acquired from time information and position information of GPS data, like in a case in which time information and position information are used by a GPS speed meter.

Then, when the speed of the moving object acquired by the moving speed acquiring unit 91 is higher than a predetermined value, a display controller 11 judges that the user's driving condition is during travel and it is dangerous to display a map to which various pieces of information are added and hence make the map essentially intended for guidance unclear, and displays map data to which no evaluation information with position is added. In contrast, when the speed of the moving object is equal to or lower than the predetermined value, the display controller judges that the user's driving condition is at rest, and displays map data to which evaluation information with position is added.

Figure 34:
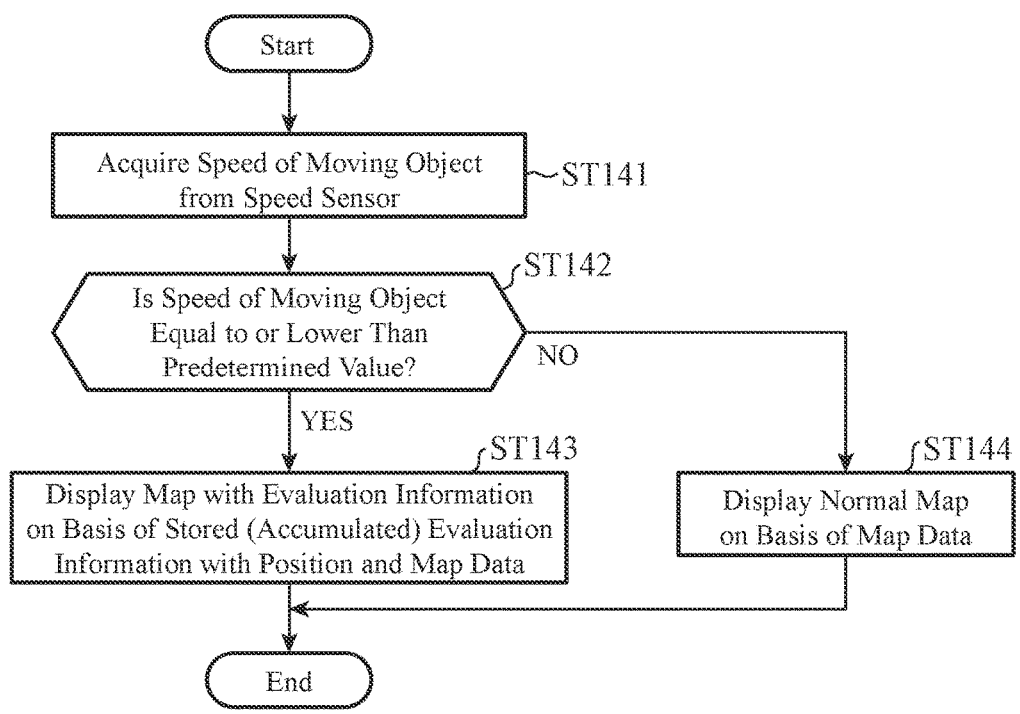
FIG. 34 is a flow chart showing an operation at the time of use of evaluation information with position which is performed by the navigation system in accordance with Embodiment 10.

Next, the operation of the navigation system in accordance with Embodiment 10 configured as above will explained. FIG. 34 is a flow chart showing the operation at the time of use of evaluation information with position which is performed by the server for navigation 101 in accordance with Embodiment 10. Because the operation at the time of registration is the same as that shown in FIG. 13 in Embodiment 3, the explanation of the operation will be omitted.

The operation at the time of use will be explained by referring to FIG. 34. The moving speed acquiring unit 91 acquires the moving speed from a signal acquired from the speed sensor 92 (step ST141). The display controller 11 determines whether or not the moving speed acquired from the moving speed acquiring unit 91 is equal to or lower than the predetermined value (e.g., 10 km/h) (step ST142).

Then, when the moving speed is equal to or lower than the predetermined value (when YES in step ST142), the display controller 11 displays a map with evaluation information on a screen, such as a display, on the basis of map data stored in a map data storage 12 in advance and evaluation information with position which is generated in step ST37 (step ST143), like in the case of step ST11 shown in FIG. 4 in Embodiment 1. In contrast, when the moving speed is higher than the predetermined value (when NO in step ST142), the display controller judges that it is dangerous to display a map to which various pieces of information are added and hence make the map essentially intended for guidance unclear, and only displays a normal map to which no evaluation information with position is added (step ST144).

Although the example of displaying map data to which no evaluation information with position is added when the speed of the moving object is higher than the predetermined value is explained in this Embodiment 10, the map data can be displayed by adding evaluation information with position to the map data by using a presenting method of making the evaluation information with position inconspicuous, such as a method of displaying the evaluation information with position in a light color, or a method of displaying only evaluation information with position whose number is large. It can be considered that when presenting evaluation information with position while making this evaluation information with position less conspicuous in this way, the safety is maintained with the evaluation information with position being not obstructive to the user even if the driving condition is during travel.

As mentioned above, because the server for navigation in accordance with this Embodiment 10 changes the presenting method according to whether or not the speed of the moving object is higher than the predetermined value, i.e., according to whether the user's driving condition is during travel or at rest, or the like, and does not add any evaluation information with position in such a way that it is not obstructive to the user when the driving condition is during travel, or presents evaluation information with position by adding this evaluation information with position by using a presenting method of making the evaluation information with position inconspicuous, the safety can be further maintained.

Embodiment 11

Figure 35:
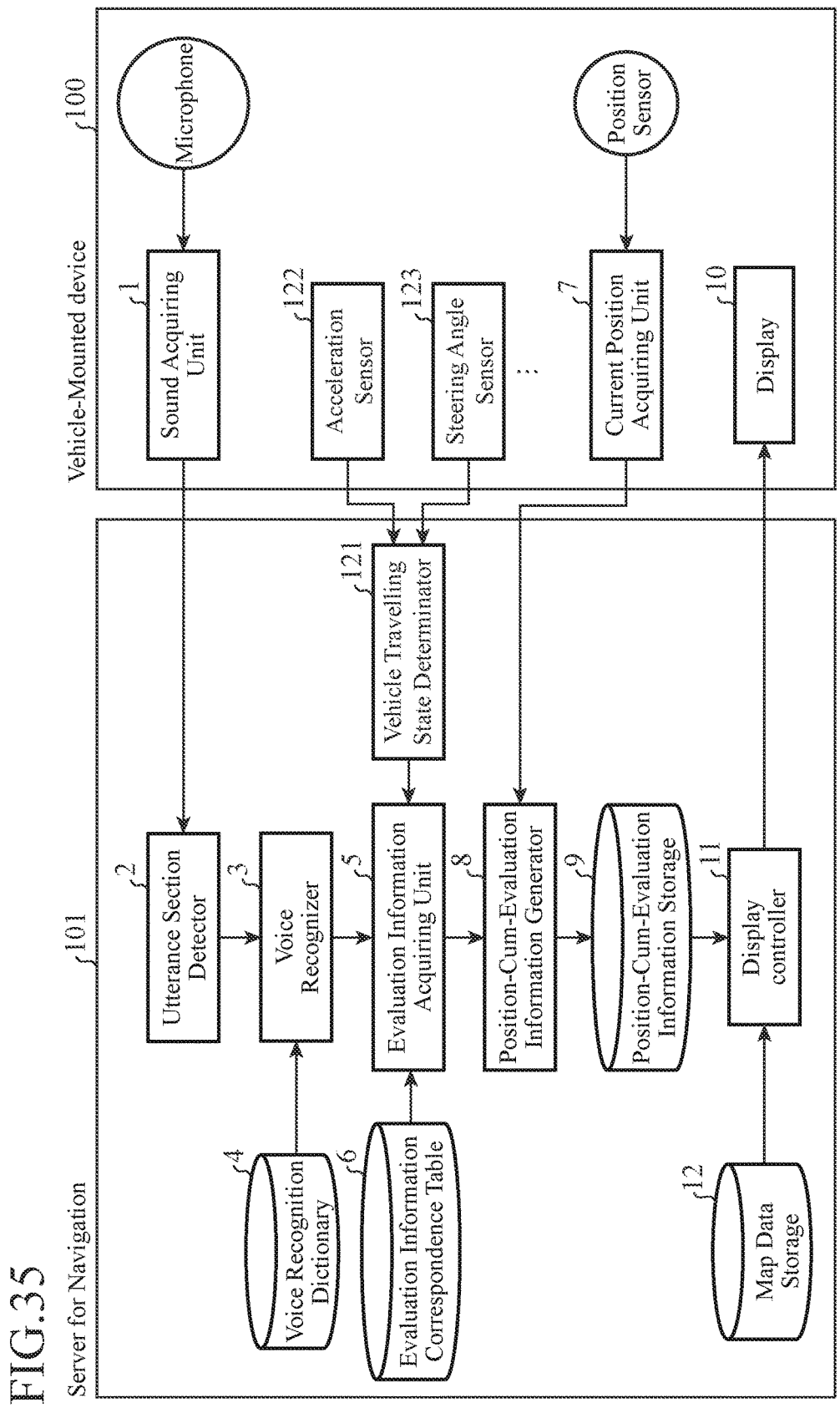
FIG. 35 is a block diagram showing an example of a navigation system in accordance with Embodiment 11.

FIG. 35 is a block diagram showing an example of a navigation system in accordance with Embodiment 11 of the present invention. The same structural components as those explained in Embodiments 1 to 10 are designated by the same reference numerals, and the duplicated explanation of the components will be omitted hereafter. In the navigation system in accordance with Embodiment 11 which will be shown below, a server for navigation 101 further includes a vehicle travelling state determinator 121, as compared with the navigation system in accordance with Embodiment 3.

The vehicle travelling state determinator 121 determines a vehicle travelling state, such as sudden braking or sudden steering, from signals acquired from various sensors, such as an acceleration sensor 122 and a steering angle sensor 123.

An evaluation information correspondence table 6 includes key words each of which can result in evaluation information of "good" and also result in evaluation information of "bad", as shown in, for example, FIG. 36.

For example, when the interjection "Oh" is uttered, this key word being included in the evaluation information correspondence table 6 shown in FIG. 36, and being defined in advance in such a way that, when whether the key word corresponds to "good" or "bad" cannot be determined from this correspondence table, the key word corresponds to the evaluation information of "good" when the vehicle travelling state is a sudden braking state, or corresponds to the evaluation information of "bad" when the vehicle travelling state is not a sudden braking state, an evaluation information acquiring unit 5 refers to the evaluation information correspondence table 6 to acquire evaluation information corresponding to the predetermined key word and based on the vehicle travelling state.

Figure 37:
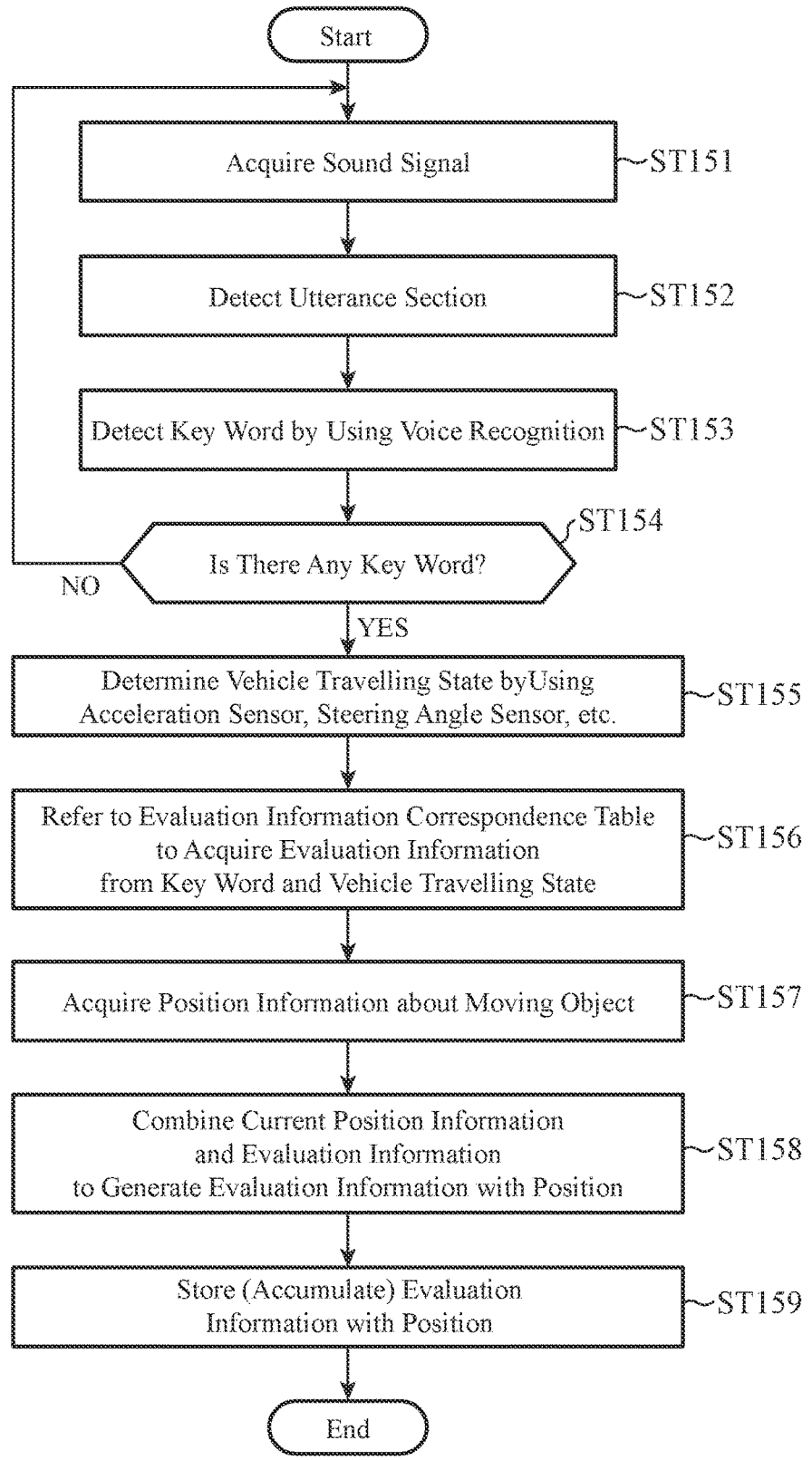
FIG. 37 is a flow chart showing an operation at the time of registration of evaluation information with position which is performed by the navigation system in accordance with Embodiment 11.

Next, the operation of the navigation system in accordance with Embodiment 11 configured as above will explained. FIG. 37 is a flow chart showing the operation at the time of registration of evaluation information with position which is performed by the server for navigation 101 in accordance with Embodiment 11. Because the operation at the time of use is the same as that shown in FIG. 4 in Embodiment 1, the explanation of the operation will be omitted hereafter.

The operation at the time of registration will be explained by referring to FIG. 37. Because processes (steps ST151 to ST154) including up to a process of extracting a predetermined key word to determine whether or not a key word is included in a recognition result, which is performed by a voice recognizer 3, are the same as those of steps ST31 to ST34 of FIG. 13 in Embodiment 3, the explanation of the processes will be omitted hereafter. Then, when a key word is included in the recognition result (when YES in step ST154), the vehicle travelling state determinator 121 determines the vehicle travelling state from signals from the acceleration sensor 122, the steering wheel angle sensor 123, and so on (step ST155).

The evaluation information acquiring unit 5 then refers to the evaluation information correspondence table 6 to acquire evaluation information corresponding to the predetermined key word and based on the vehicle travelling state determined by the vehicle travelling state determinator 121 (step ST156). Because subsequent processes (step ST157 to ST159) including from acquisition of position information to storing of evaluation information with position are the same as those of steps ST36 to ST38 of FIG. 13 in Embodiment 3, the explanation of the processes will be omitted hereafter.

As a result, when making sudden braking or sudden steering or sounding the horn because of the occurrence of an emergent event, and so on, evaluation information with position can be left automatically. Further, even if the user makes an utterance having the same contents, an evaluation ("good" or "bad") according to an emergent event can be provided discriminately. In addition, the precision of mapping of the recognition result to evaluation information can be improved.

Even in a case in which an emergent event occurring is very sudden, and therefore the user cannot utter any key word connected directly with an evaluation and it cannot be decided whether an evaluation of "good" or "bad" is provided only from the key word, an evaluation can be made on the basis of the vehicle travelling state.

Figure 38:
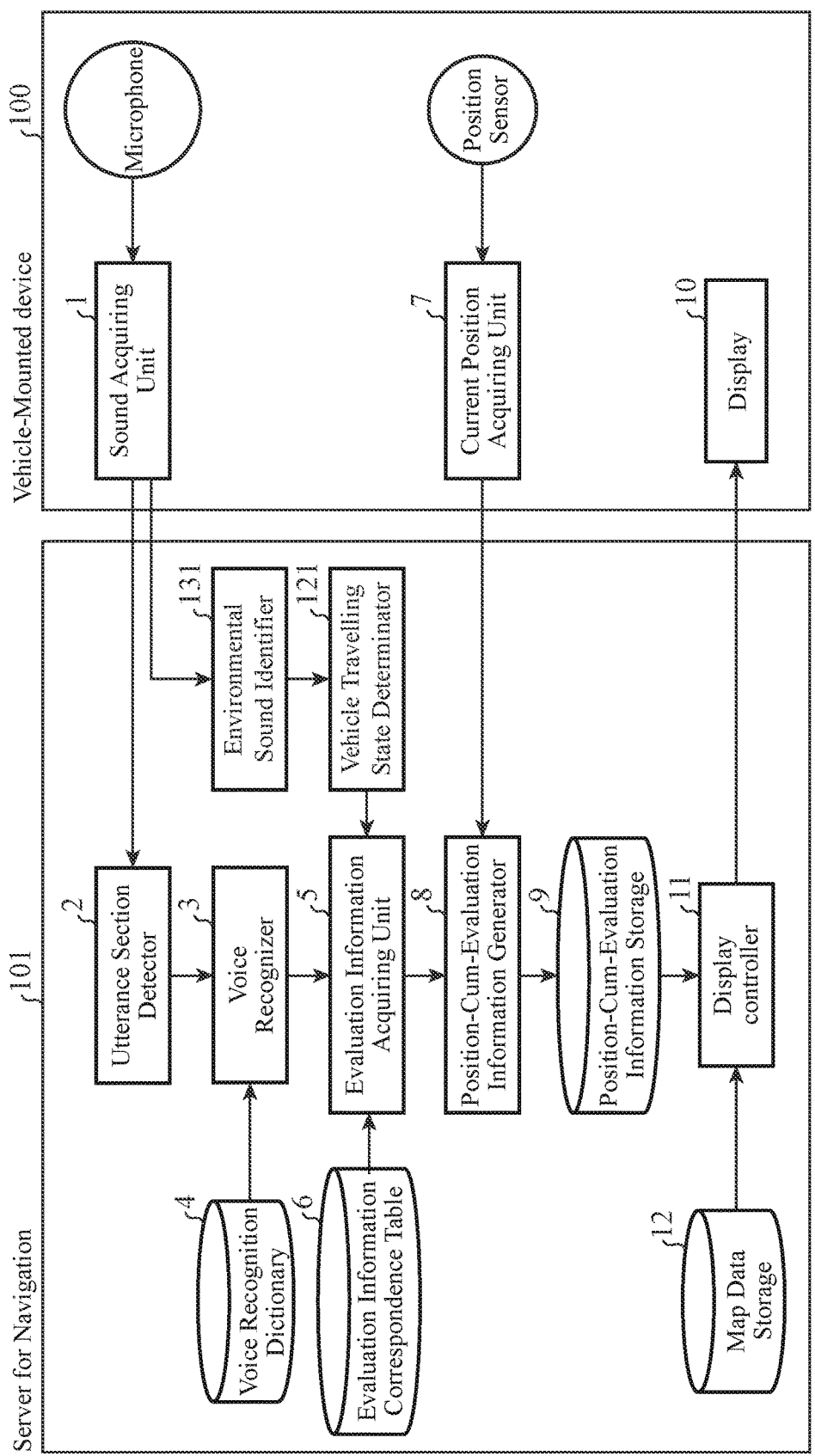
FIG. 38 is a block diagram showing another example of the navigation system in accordance with Embodiment 11.

Further, as shown in FIG. 38, the navigation system can further include an environmental sound identifier 131 so as to be able to identify a sound (an environmental sound) in the surroundings of the vehicle (the moving object), such as a sudden braking sound, a horn sound, slip noise of a tire, or collision noise, from a sound signal acquired by a sound acquiring unit 1. The vehicle travelling state determinator 121 then determines the vehicle travelling state on the basis of the identified environmental sound. Also in this case, the evaluation information acquiring unit 5 similarly refers to the evaluation information correspondence table 6 to acquire evaluation information corresponding to the predetermined key word and based on the vehicle travelling state. In the environmental sound identifying process, a typical HMM method according to a model which is customized to environmental sounds can be used.

As a result, not only when the driver of the vehicle brakes suddenly or turns the steering wheel suddenly, or sounds the horn because of the occurrence of an emergent event, but also when the driver of another vehicle travelling in the vicinity brakes suddenly or turns the steering wheel suddenly, or sounds the horn, the navigation system can leave evaluation information with position automatically if the navigation system simply acquires the sound. Further, even if the user makes an utterance having the same contents, an evaluation ("good" or "bad") according to an emergent event can be provided discriminately. In addition, the precision of mapping of the recognition result to evaluation information can be improved.

Embodiment 12

Figure 39:
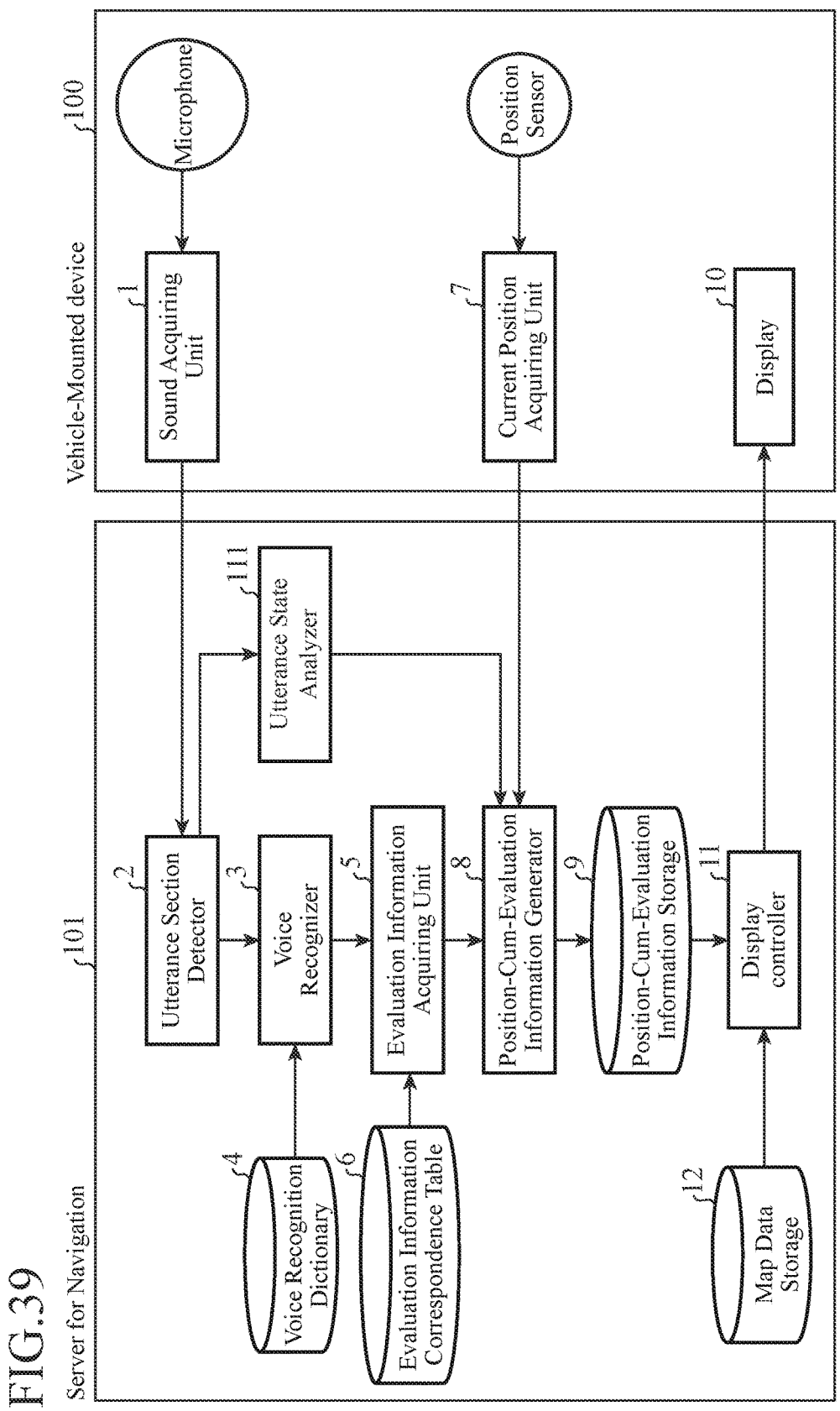
FIG. 39 is a block diagram showing an example of a navigation system in accordance with Embodiment 12.

FIG. 39 is a block diagram showing an example of a navigation system in accordance with Embodiment 12 of the present invention. The same structural components as those explained in Embodiments 1 to 11 are designated by the same reference numerals, and the duplicated explanation of the components will be omitted hereafter. In the navigation system in accordance with Embodiment 12 which will be shown below, a server for navigation 101 further includes an utterance state analyzer 111, as compared with the navigation system in accordance with Embodiment 3.

The utterance state analyzer 111 analyzes voice data in an utterance section detected by an utterance section detector 2, analyzes at least one of the sound volume of the uttered voice, and prosody information, such as the strength, the length, or the pitch of the voice, and acquires information indicating that the sound volume or the prosody information is equal to or greater than a predetermined value, or that the sound volume or the prosody information is equal to or greater (or higher), by a predetermined value, than the user's average sound volume or average prosody information. As a result, when the sound volume of the voice is large or when there is a change of the prosody information, such as when the pitch becomes high, it can be judged that the user has uttered with a stronger emotion than that at the time of uttering ordinarily.

When generating evaluation information with position by combining current position information and evaluation information, a position-cum-evaluation information generator 8 performs weighting and generates evaluation information with position on the basis of the sound volume or the prosody information acquired by the utterance state analyzer 111. For example, when the sound volume of the utterance is equal to or greater than the predetermined value, the position-cum-evaluation information generator assigns a weight to the evaluation information with position, for example, handles the evaluation information with position as two pieces of evaluation information with position. Although the example of handling the evaluation information with position as two pieces of evaluation information with position as the weighting is shown above, the evaluation information with position can be alternatively handled as one and a half or three pieces. The number of pieces can be determined arbitrarily. For example, in the case of the sound volume of the utterance, the evaluation information with position is handled as two pieces when the sound volume is equal to or greater than a first predetermined value, and is handled as three pieces when the sound volume is equal to or greater than a second predetermined value.

Figure 40:
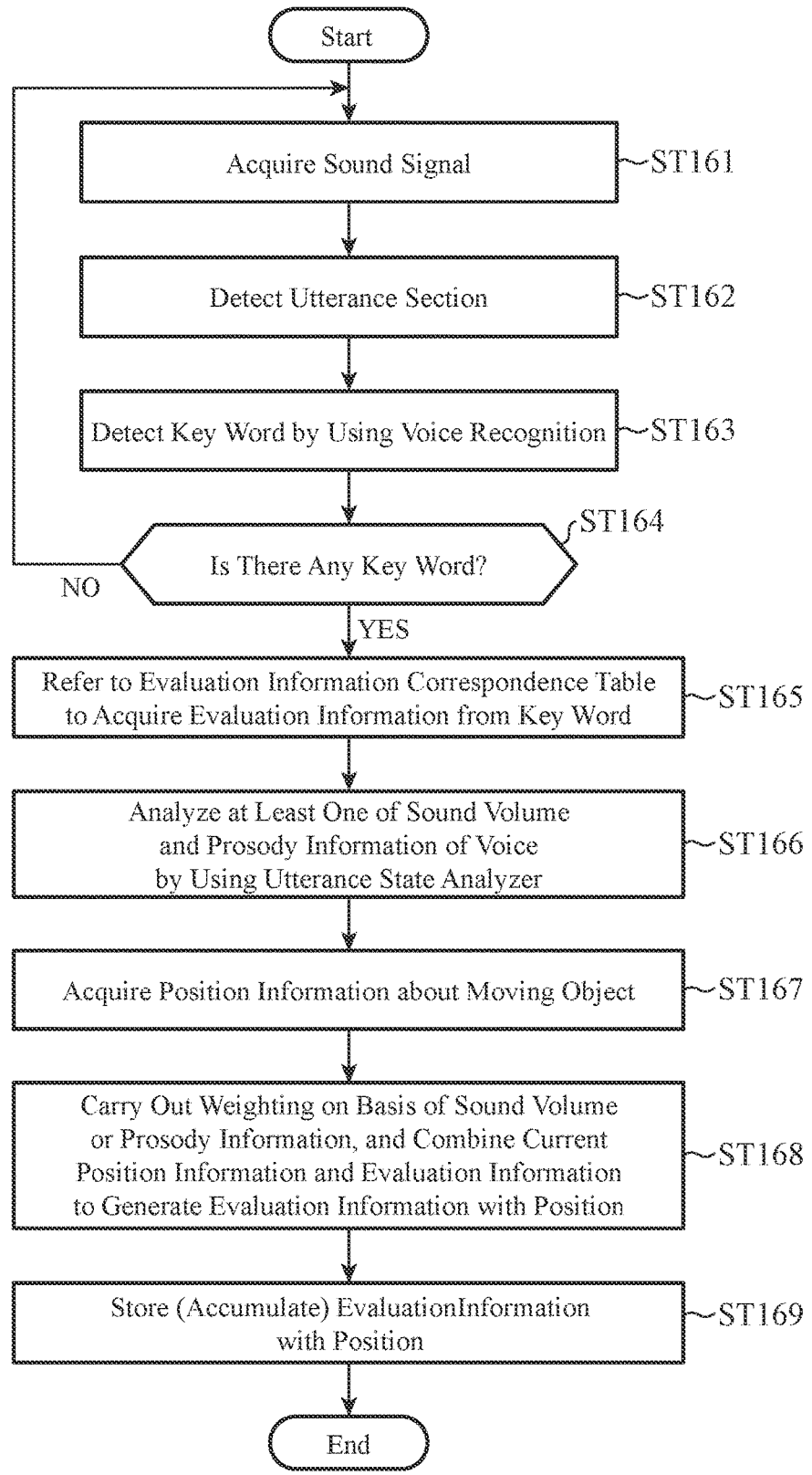
FIG. 40 is a flow chart showing an operation at the time of registration of evaluation information with position which is performed by the navigation system in accordance with Embodiment 12.

Next, the operation of the navigation system in accordance with Embodiment 12 configured as above will be explained. FIG. 40 is a flow chart showing the operation at the time of registration of evaluation information with position which is performed by the server for navigation 101 in accordance with Embodiment 12. Because the operation at the time of use is the same as that shown in FIG. 4 in Embodiment 1, the explanation of the operation will be omitted hereafter.

The operation at the time of registration will be explained by referring to FIG. 40. Because processes (steps ST161 to ST165) including up to acquisition of evaluation information which is performed by an evaluation information acquiring unit 5 are the same as those of steps ST31 to ST35 of FIG. 13 in Embodiment 3, the explanation of the operation will be omitted hereafter. The utterance state analyzer 111 then analyzes the voice data in the utterance section detected by the utterance section detector 2, and analyzes at least one of the sound volume and the prosody information of the uttered voice (step ST166). A current position acquiring unit 7 then acquires the current position information of a vehicle (moving object) on the basis of information from a position sensor (step ST167).

When generating evaluation information with position by combining the current position information acquired by the current position acquiring unit 7 in step ST167, the position-cum-evaluation information generator 8 performs weighting to generate evaluation information with position on the basis of the sound volume or the prosody information of the voice analyzed by the utterance state analyzer 111 in step ST166 (step ST168). The navigation system then stores the generated evaluation information with position in a position-cum-evaluation information storage 9 (step ST169). More specifically, the navigation system carries out weighting according to the utterance state on the evaluation information acquired in step ST165, and also links the evaluation information with the point for which the evaluation has been made and stores the evaluation information.

As mentioned above, the server for navigation in accordance with this Embodiment 12 can carry out an evaluation according to the emotion which the user has at the time of uttering by taking into consideration the sound volume or the prosody information of the user's uttered voice. For example, the server for navigation stores the evaluation information as two pieces of evaluation information when it is judged that the user has uttered with a stronger emotion at the time of uttering.

Although the explanation is made above by assuming that the server for navigation in accordance with either one of above-mentioned Embodiments 4 to 12 is the one in which some components are added to the server for navigation in accordance with Embodiment 3, it needless to say that the server for navigation in accordance with either one of above-mentioned Embodiments 4 to 12 can be the one in which the components are added to the server for navigation in accordance with Embodiment 1 or 2.

Embodiment 13

Although in Embodiments 1 to 12, the explanation is made by assuming that the vehicle-mounted device carried in or mounted in the vehicle performs the processes of the navigation function and the display control function in cooperation with the server for navigation, the present invention can also be applied to applications of the navigation function and the display control function which are installed in a mobile information terminal, such as a smart phone, a tablet PC, or a mobile phone, or and can also be applied to a case in which a mobile information terminal or the like and the server for navigation execute applications of the navigation function and the display control function in cooperation with each other.

Figure 41:
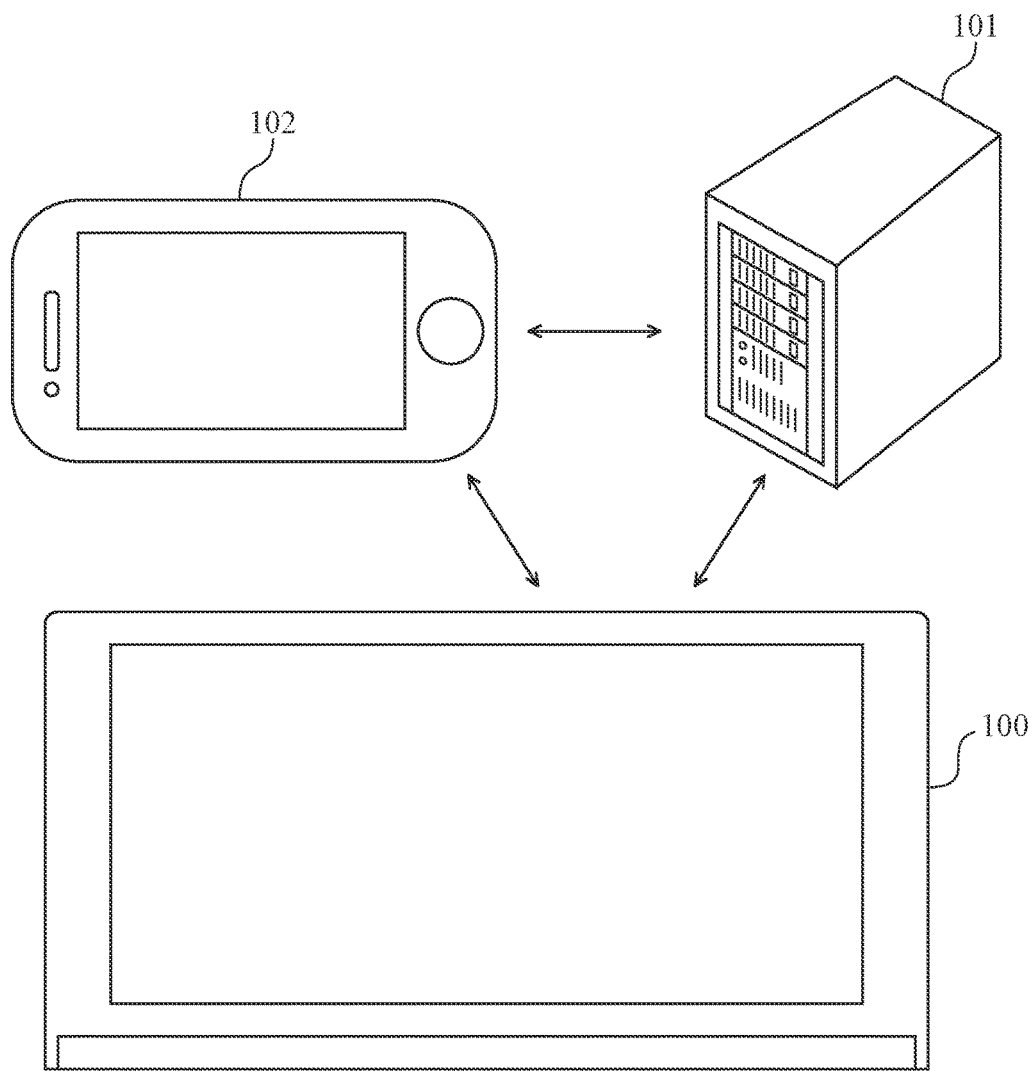
FIG. 41 is a diagram showing an outline of a navigation system in accordance with Embodiment 13.

FIG. 41 is a diagram showing an outline of a navigation system in accordance with Embodiment 13 of the present invention. This navigation system can have one of various configurations including a configuration in which a vehicle-mounted device 100 performs a navigation process and display control in cooperation with a mobile information terminal 102, such as a smart phone, and a server for navigation 101, and a configuration in which at least one of a mobile information terminals 102, such as a smart phone, and a server for navigation 101 performs a navigation process and display control to cause a vehicle-mounted device 100 to provide route guidance and display map information. Hereafter, examples of the configuration of the navigation system will be explained.

An explanation will be made as to a case in which in the navigation system in accordance with this Embodiment 13, the mobile information terminal 102 performs a navigation process and display control in cooperation with the server for navigation 101, to cause the vehicle-mounted device 100 to present the results of the navigation process and the display control present to provide the results for the user.

In this configuration, there can be considered a case in which the vehicle-mounted device 100 communicates with the server for navigation 101 via the mobile information terminal 102, and applications in the mobile information terminal 102 perform the navigation process and the display control in cooperation with the server for navigation 101.

More specifically, the applications in the mobile information terminal 102 cause the vehicle-mounted device 100 which is an output device (a display device) to present a route search result based on a destination inputted by the user, a search result based on the genre of a stop-off point, etc. together with map information.

Even if the navigation system is configured in this way, the same advantages as those provided by either one of Embodiments 1 to 12 can be provided.

Further, although the example of applying the navigation system in accordance with the present invention to a moving object, such as a vehicle, is explained in the above-mentioned embodiments, this navigation system is not limited to the one for vehicles and the present invention can also be applied to various navigation systems for moving objects including a person, a vehicle, a rail car, a ship, and an airplane. Further, the present invention can be applied not only to a navigation system mounted in a moving object, such as a vehicle, but also to any type of device, such as a navigation system, which is installed in a smart phone, a tablet PC, a mobile phone, or the like.

While the invention has been described in its preferred embodiments, it is to be understood that an arbitrary combination of two or more of the above-mentioned embodiments can be made, various changes can be made in an arbitrary component in accordance with any one of the above-mentioned embodiments, and an arbitrary component in accordance with any one of the above-mentioned embodiments can be omitted within the scope of the invention.

INDUSTRIAL APPLICABILITY

The navigation system in accordance with the present invention can be applied to various navigation systems for moving objects including a person, a vehicle, a rail car, a ship, and an airplane.

EXPLANATIONS OF REFERENCE NUMERALS 1 sound acquiring unit, 2 utterance section detector, 3 voice recognizer, 4 voice recognition dictionary, 5 evaluation information acquiring unit, 6 evaluation information correspondence table, 7 current position acquiring unit, 8 position-cum-evaluation information generator, 9 position-cum-evaluation information storage, 10 display (display unit), 11 display controller, 12 map data storage, 13 display screen, 14 vehicle mark, 15 path mark, 16 balloon, 17 region showing evaluation information of "good", 18 region showing evaluation information of "bad", 19 position-cum-evaluation information analyzer, 31 moving path acquiring unit, 32 moving path, 41 date and time information acquiring unit, 51 weather information acquiring unit, 61 usage pattern acquiring unit, 62 usage pattern detector, 71 operation history storage, 72 user information storage, 73 user attribute analyzer, 81 condition information acquiring unit, 82 condition specifier, 91 moving speed acquiring unit, 92 speed sensor, 100 vehicle-mounted device (display device), 101 server for navigation, 102 mobile information terminal, 111 utterance state analyzer, 121 vehicle travelling state determinator, 122 acceleration sensor, 123 steering angle sensor, and 131 environmental sound identifier.

The invention claimed is:

1. A server for navigation that causes a navigation device mounted in a moving object to provide guidance on a moving route and display map data on a display screen on a basis of the map data and a position of a said moving object, said server for navigation comprising:
a memory; and
a processor coupled to the memory, the processor being configured to execute instructions stored in the memory to perform a process including:
acquiring a predetermined key word which is extracted by regularly performing recognition on data about a voice uttered by a user from said navigation device;
referring to an evaluation information correspondence table in which a plurality of key words are brought into correspondence with evaluations respectively for each of said key words in advance to acquire evaluation information corresponding to said predetermined key word acquired thereby;
combining said acquired evaluation information and a current position of said moving object acquired from said navigation device to generate position-cum-evaluation information;
storing the generated position-cum-evaluation information; and
adding predetermined position-cum-evaluation information stored in said storing step to said map data, and causing said navigation device to display of the map data to which said position-cum-evaluation information is added on said display screen.

2. A sever for navigation that causes a navigation device mounted in a moving object to provide guidance on a moving routs and display map data on a basis of the map data and a position of said moving object, said sever for navigation comprising:
a memory; and
a processor coupled to the memory, the processor being configured to execute instructions stored in the memory to perform a process including:
perform recognition on data about a voice uttered by a user and extracting a predetermined key word;
referring to an evaluation information correspondence table in which a plurality of key words are brought into correspondence with evaluations respectively for each of said key words in advance to acquire valuation information corresponding to said extracted predetermined key word;
combining said acquired evaluation information and a current position of said moving object acquired from said navigation device to generate position-cum-evaluation information;
storing the generated position-cum-evaluation information; and
adding predetermined, stored position-cum-evaluation information to said map data, and causing said navigation device to display the nap data to which said position-cum-evaluation information is added.

3. The server for navigation according to claim 2, wherein said server for navigation further includes an utterance section detector to detect an utterance section of a voice uttered by said user and extracts voice data, and said voice recognizer performs recognition on the voice data extracted by said utterance section detector.

4. The server for navigation according to claim 1, wherein on a basis of both the current position of said moving object and the position-cum-evaluation information stored in said position-cum-evaluation information storage, said display controller causes said navigation device to display the map data to which said position-cum-evaluation information is added when passing through a point or a region about which said position-cum-evaluation information has been registered, or its neighborhood, or only when it is scheduled to pass through the point, the region, or its neighborhood.

5. The server for navigation according to claim 1, wherein said server for navigation further includes a position-cum-evaluation information analyzer to analyze a number of pieces of position-cum-evaluation information stored in said position-cum-evaluation information storage, and wherein said display controller causes said navigation device to display the map data to which said position-cum-evaluation information is added on a basis of an analysis result acquired by said position-cum-evaluation information analyzer.

6. A navigation system provided with a server for navigation that causes a navigation device mounted in a moving object to provide guidance on a moving route and display map data on a display screen on a basis of the map data and a position of said moving object, and said navigation device, wherein said navigation device comprises:
   a first memory; and
   a first processor coupled to the first memory, the first processor being configured to execute instructions stored in the first memory to perform a process including:
   regularly performing recognition on data about a voice uttered by a user and extracting a predetermined key word; and
   acquiring a current position of said moving object;
   and said server for navigation comprises:
   a second memory; and
   a second processor coupled to the second memory, the second processor being configured to execute instructions stored in the second memory to perform a process including:
   acquiring a predetermined, extracted key word from said navigation device;
   referring to an evaluation information correspondence table in which a plurality of key words are brought into correspondence with evaluation respectively for each of said key words in advance to acquire evaluation information corresponding to said predetermined key word acquired thereby;
   acquiring the acquired current position of the moving object from said navigation device;
   combining the acquired evaluation information and the current position of said moving object to generate position-cum-evaluation information;
   storing the generated position-cum-evaluation information; and
   adding predetermined, stored position-cum-evaluation information to said map data, and causing said navigation device to display the map data to which said position-cum-evaluation information is added on said display screen.

7. A navigation method, which is performed by a navigation server, of causing a navigation device mounted in a moving object to provide guidance on a moving route and display map data on a basis of the map data and a position of said moving object, said navigation method comprising the steps of:
   regularly performing recognition on data about a voice uttered by a user and extracting a predetermined key word;
   acquiring evaluation information by referring to an evaluation information correspondence table in which a plurality of key words are brought into correspondence with evaluations respectively for each of said key words in advance to acquire evaluation information corresponding to said predetermined key word;
   generating position-cum-evaluation information by combining the evaluation information acquired in said evaluation information acquiring step and a current position of said moving object to generate position-cum-evaluation information;
   storing the position-cum-evaluation information generated in said position-cum-evaluation information generating step; and
   controlling display by adding predetermined position-cum-evaluation information stored in said position-cum-evaluation information storing step to said map data, and also causing said navigation device to display of the map data to which said position-cum-evaluation information is added.

* * * * *